(12) United States Patent
Yoshizaki et al.

(10) Patent No.: US 9,778,823 B2
(45) Date of Patent: Oct. 3, 2017

(54) IMAGE PROCESSING APPARATUS, IMAGE PROCESSING METHOD, AND NON-TRANSITORY COMPUTER READABLE MEDIUM

(71) Applicant: FUJI XEROX CO., LTD., Minato-ku, Tokyo (JP)

(72) Inventors: Akane Yoshizaki, Kanagawa (JP); Shigeru Okada, Kanagawa (JP); Katsuya Koyanagi, Kanagawa (JP); Shintaro Adachi, Kanagawa (JP); Minoru Sodeura, Kanagawa (JP); Shinji Hanaoka, Kanagawa (JP); Hiroyuki Kishimoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 315 days.

(21) Appl. No.: 14/562,844

(22) Filed: Dec. 8, 2014

(65) Prior Publication Data
US 2015/0193430 A1    Jul. 9, 2015

(30) Foreign Application Priority Data

Jan. 9, 2014    (JP) ................................ 2014-002629

(51) Int. Cl.
*G06F 15/00* (2006.01)
*G06F 13/00* (2006.01)
(Continued)

(52) U.S. Cl.
CPC .......... *G06F 3/0483* (2013.01); *G06F 17/217* (2013.01); *G06F 17/30884* (2013.01)

(58) Field of Classification Search
CPC ........................... G06F 17/30994; G06F 17/30
(Continued)

(56) References Cited

U.S. PATENT DOCUMENTS

2010/0188690 A1* 7/2010 Moriya ................. G06F 3/1205
358/1.15
2012/0297299 A1* 11/2012 Shiohara ............ H04N 1/00405
715/274
(Continued)

FOREIGN PATENT DOCUMENTS

| JP | 2006-4050 A | 1/2006 |
|---|---|---|
| JP | 2009-26122 A | 2/2009 |
| JP | 2009-87270 A | 4/2009 |

*Primary Examiner* — Kevin Nguyen
(74) *Attorney, Agent, or Firm* — Sughrue Mion, PLLC

(57) ABSTRACT

An image processing apparatus includes a difference-information acquiring unit that acquires difference information indicating a correspondence relationship between a difference section and a page having the difference section in two electronic documents each having multiple pages; a difference-display-document acquiring unit that acquires a difference display document in which the difference section is indicated in contents of at least one of the two electronic documents; an electronic-bookmark adding unit that adds first electronic-bookmark information to a page having the difference section in the difference display document and that adds second electronic-bookmark information to a page not having the difference section in the difference display document based on the difference information; and a display controller that causes a display unit to display a first electronic bookmark corresponding to the first electronic-bookmark information and a second electronic bookmark corresponding to the second electronic-bookmark information in a distinguishable manner.

11 Claims, 21 Drawing Sheets

(51) Int. Cl.
*G06F 3/0483* (2013.01)
*G06F 17/21* (2006.01)
*G06F 17/30* (2006.01)

(58) Field of Classification Search
USPC ......... 715/700, 763–765, 840, 780, 851–853
See application file for complete search history.

(56) References Cited

U.S. PATENT DOCUMENTS

2014/0110473 A1* 4/2014 Zhou ................ G06F 17/30846
    235/375
2014/0304591 A1* 10/2014 Yamamoto .......... G06F 17/2247
    715/234

\* cited by examiner

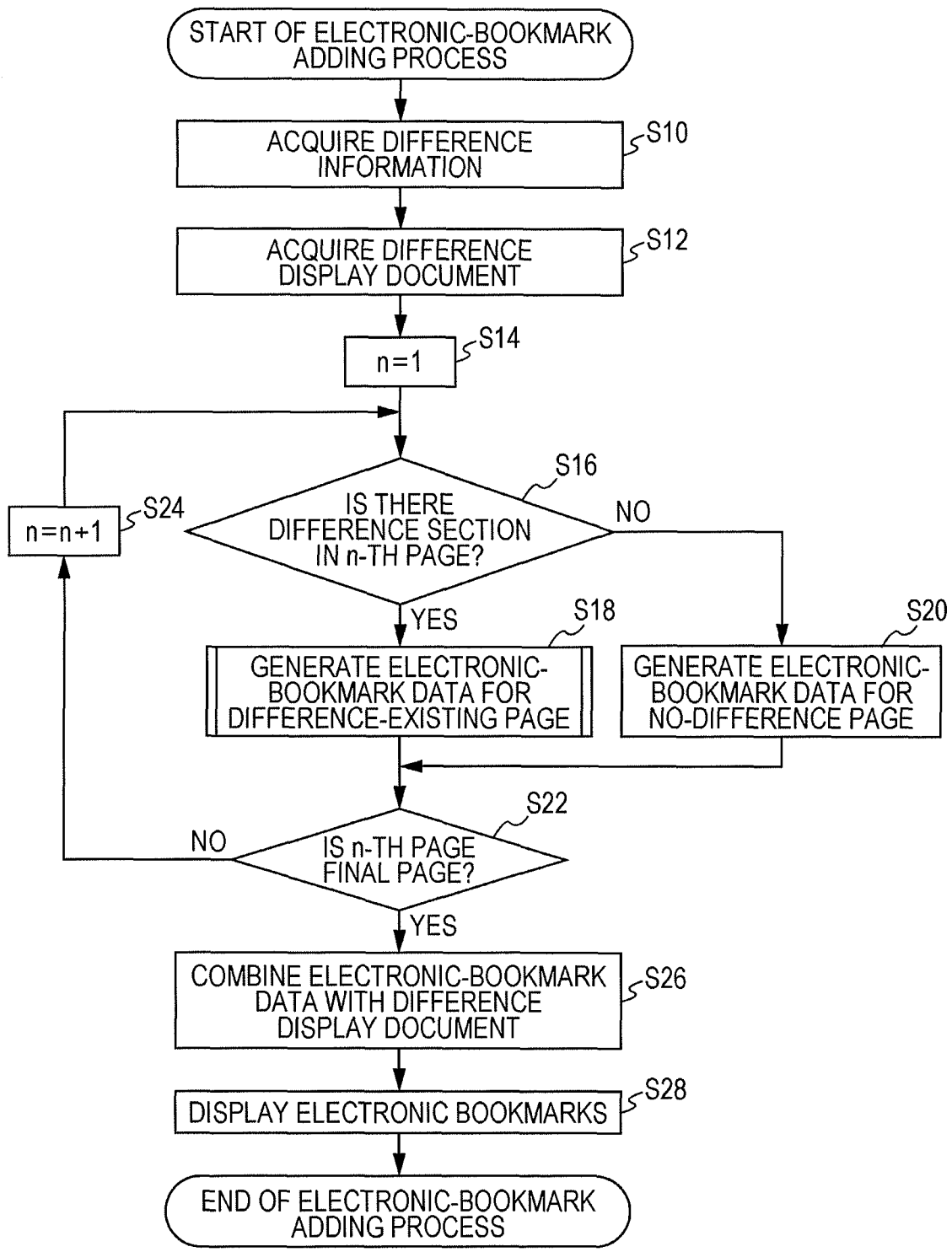

FIG. 10

| PAGE NUMBER 40 | POSITIONAL INFORMATION 100 | REGION-RANGE INFORMATION 102 | DIFFERENCE NUMBER 42 |
|---|---|---|---|
| 1 | (xxx1, yyy1) | (xxx2, yyy2)<br>(xxx2', yyy2') | DIFFERENCE 1 |
| 1 | (xxx3, yyy3) | (xxx4, yyy4)<br>(xxx4', yyy4') | DIFFERENCE 2 |
| 1 | (xxx5, yyy5) | (xxx6, yyy6)<br>(xxx6', yyy6') | DIFFERENCE 3 |
| 2 | (xxx7, yyy7) | (xxx8, yyy8)<br>(xxx8', yyy8') | DIFFERENCE 4 |
| 5 | (xxx9, yyy9) | (xxx10, yyy10)<br>(xxx10', yyy10') | DIFFERENCE 5 |
| ... | ... | ... | ... |

FIG. 15

| PAGE NUMBER 40 | POSITIONAL INFORMATION 100 | REGION-RANGE INFORMATION 102 | DIFFERENCE NUMBER 130 |
|---|---|---|---|
| 1 | (xxx1, yyy1) | (xxx2, yyy2)<br>(xxx2', yyy2') | DELETED 1 |
| 1 | (xxx3, yyy3) | (xxx4, yyy4)<br>(xxx4', yyy4') | ADDED 1 |
| 1 | (xxx5, yyy5) | (xxx6, yyy6)<br>(xxx6', yyy6') | ADDED 2 |
| 2 | (xxx7, yyy7) | (xxx8, yyy8)<br>(xxx8', yyy8') | CORRECTED 1 |
| 5 | (xxx9, yyy9) | (xxx10, yyy10)<br>(xxx10', yyy10') | DELETED 2 |
| ... | ... | ... | ... |

FIG. 19

| PAGE NUMBER 40 | POSITIONAL INFORMATION 100 | REGION-RANGE INFORMATION 102 | DIFFERENCE NUMBER 120 | PAGE-EDITING 160 |
|---|---|---|---|---|
| 1 | (xxx1, yyy1) | (xxx2, yyy2)<br>(xxx2', yyy2') | DELETED 1 | --- |
| 1 | (xxx3, yyy3) | (xxx4, yyy4)<br>(xxx4', yyy4') | ADDED 1 | --- |
| 1 | (xxx5, yyy5) | (xxx6, yyy6)<br>(xxx6', yyy6') | ADDED 2 | --- |
| 2 | (−1, −1) | (−1, −1) | --- | DELETED |
| 4-2 | (−2, −2) | (−2, −2) | --- | ADDED |
| 6 | (−37, −37) | (−37, −37) | --- | INTERCHANGED WITH 7 |
| 7 | (−36, −36) | (−36, −36) | --- | INTERCHANGED WITH 6 |
| ... | ... | ... | ... | ... |

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-002629 filed Jan. 9, 2014.

BACKGROUND

Technical Field

The present invention relates to image processing apparatuses, image processing methods, and non-transitory computer readable media.

SUMMARY

According to an aspect of the invention, there is provided an image processing apparatus including a difference-information acquiring unit, a difference-display-document acquiring unit, an electronic-bookmark adding unit, and a display controller. The difference-information acquiring unit acquires difference information indicating a correspondence relationship between a difference section and a page having the difference section in two electronic documents each having multiple pages. The difference-display-document acquiring unit acquires a difference display document in which the difference section is indicated in contents of at least one of the two electronic documents. The electronic-bookmark adding unit adds first electronic-bookmark information to a page having the difference section in the difference display document and adds second electronic-bookmark information to a page not having the difference section in the difference display document based on the difference information. The display controller causes a display unit to display a first electronic bookmark corresponding to the first electronic-bookmark information and a second electronic bookmark corresponding to the second electronic-bookmark information in a distinguishable manner.

BRIEF DESCRIPTION OF THE DRAWINGS

Exemplary embodiments of the present invention will be described in detail based on the following figures, wherein:

FIG. 4 is a flowchart illustrating the flow of a process according to the first exemplary embodiment;

FIG. 10 illustrates a data structure of difference information according to a third exemplary embodiment;

FIG. 15 illustrates a data structure of difference information according to a fourth exemplary embodiment;

FIG. 19 illustrates a data structure of difference information according to a fifth exemplary embodiment;

DETAILED DESCRIPTION

Exemplary embodiments according to the present invention will be described below. The present invention is not limited to the following exemplary embodiments.

First Exemplary Embodiment

Figure 1:
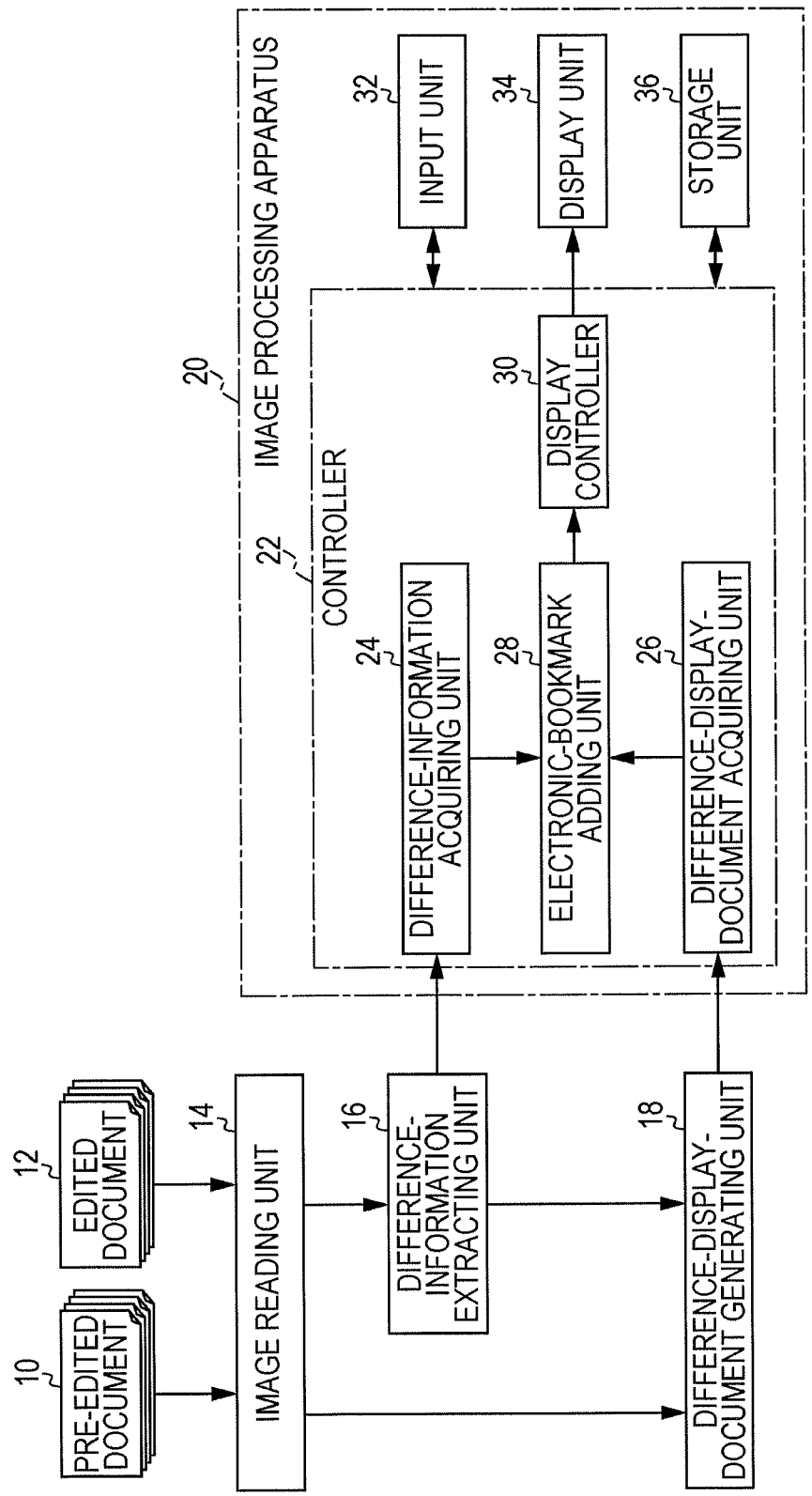
FIG. 1 schematically illustrates the configuration of an image processing apparatus according to an exemplary embodiment and peripheral devices.

FIG. 1 schematically illustrates the configuration of an image processing apparatus according to a first exemplary embodiment and peripheral devices. Although FIG. 1 illustrates an image processing apparatus 20 according to the first exemplary embodiment, as well as an image reading unit 14, a difference-information extracting unit 16, and a difference-display-document generating unit 18 as the peripheral devices, the functions of the peripheral devices may be partially or entirely included in the image processing apparatus 20.

Each of a pre-edited document 10 and an edited document 12 is a paper document having multiple pages. The edited document 12 is a document created by adding or deleting, for example, a figure or a line segment to or from one or multiple sections in the pre-edited document 10 or by, for example, changing a color in one or multiple sections in the pre-edited document 10. In the first exemplary embodiment, although the pre-edited document 10 and the edited document 12 are described as being drawings as an example, the pre-edited document 10 and the edited document 12 are not limited to drawings and may alternatively be, for example, photographs or magazine manuscripts.

The image reading unit 14 is, for example, a scanner function included in a multifunction device and reads the pre-edited document 10 and the edited document 12, which are paper media, and converts the read data into image data.

The difference-information extracting unit 16 compares the pre-edited document 10 and the edited document 12, which have been converted into image data, and identifies a difference section, which is a section where the two documents differ from each other. The difference section may be identified by using a technique known in the related art. For example, corresponding pages between the pre-edited document 10 and the edited document 12 are first identified, and then characteristic points included in the corresponding pages are detected. The characteristic points are points within the image data that indicate characteristic sections of the images, and are, for example, end points of line segments. Subsequently, the corresponding pages are positioned so that the positions of the detected characteristic points within the images substantially match, and it is determined whether or not pixel values with respect to pixels at the same position match. As a result of the determination, a pixel position where the pixel values differ from each other by a predetermined value or more is identified as a difference section.

Furthermore, the difference-information extracting unit 16 defines a region-of-interest that includes the identified difference section. Although the region-of-interest in the first exemplary embodiment is a rectangular region with a predetermined size that circumscribes the difference section, the region-of-interest may alternatively be a circular or elliptical region that circumscribes the difference section. The region-of-interest is defined based on, for example, positional information related to end points of the difference section. If multiple difference sections exist within a small range, multiple difference sections may be included in one region-of-interest. In this case, information related to the number of difference sections included in one region-of-interest is desirably set in association with the region-of-interest.

Based on the identified difference section or the defined region-of-interest, the difference-information extracting unit 16 generates difference information related to the difference section between the pre-edited document 10 and the edited document 12. The difference information will be described later with reference to FIG. 2.

The difference-display-document generating unit 18 receives the information related to the difference section from the difference-information extracting unit 16 and generates a difference display document in which the difference section is indicated in the contents of the pre-edited document 10. Alternatively, the difference display document may be a document in which the difference section is indicated in the contents of the edited document 12. Furthermore, the difference-display-document generating unit 18 may receive information related to the region-of-interest from the difference-information extracting unit 16 and add the information related to the region-of-interest to the difference display document. The difference display document will be described later with reference to FIG. 3.

The image processing apparatus 20 may be, for example, a personal computer, and includes a controller 22, an input unit 32, a display unit 34, and a storage unit 36. The controller 22 includes a difference-information acquiring unit 24, a difference-display-document acquiring unit 26, an electronic-bookmark adding unit 28, and a display controller 30. The functions of the units included in the controller 22 are realized by a program. The program is stored in the storage unit 36.

The controller 22 is, for example, a central processing unit (CPU) of the image processing apparatus 20 and performs overall control of the image processing apparatus 20 in addition to the functions of the aforementioned units.

The difference-information acquiring unit 24 acquires the difference information extracted by the difference-information extracting unit 16. The difference-display-document acquiring unit 26 acquires the difference display document generated by the difference-display-document generating unit 18. The difference information or the difference display document may be acquired, for example, via a cable, such as a universal serial bus (USB) cable, or via a communication line, such as the Internet, in a wired or wireless manner.

Based on the difference information acquired by the difference-information acquiring unit 24, the electronic-bookmark adding unit 28 adds an electronic bookmark to the difference display document acquired by the difference-display-document acquiring unit 26. An electronic-bookmark adding process will be described later with reference to flowcharts in FIGS. 4 to 5B as well as FIGS. 6 to 8.

The display controller 30 performs control for causing the display unit 34 to display the difference display document, which has the electronic bookmark added thereto by the electronic-bookmark adding unit 28, together with the added electronic bookmark.

The input unit 32 is, for example, a mouse, a keyboard, and the like and is used for inputting a command from an operator to the image processing apparatus 20.

The display unit 34 is, for example, a monitor and is configured to display information from the display controller 30.

The storage unit 36 is, for example, a read-only memory (ROM) or a random access memory (RAM) and stores, for example, the program for realizing the functions of the units included in the controller 22 or the difference information and the difference display document.

Figure 2:
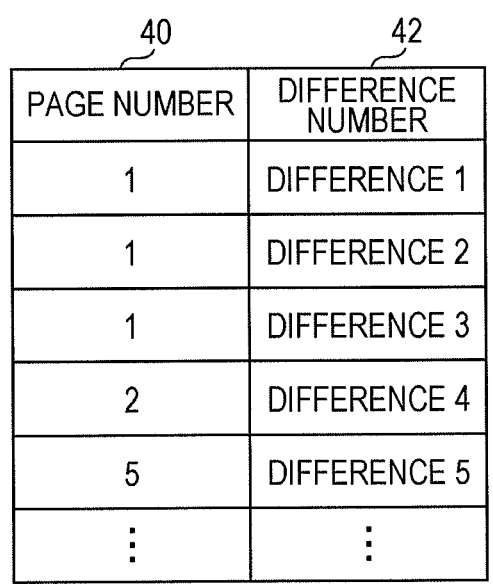
FIG. 2 illustrates a data structure of difference information according to a first exemplary embodiment.

FIG. 2 illustrates a data structure of the difference information according to the first exemplary embodiment. In the difference information according to the first exemplary embodiment, a difference section and a page number having the difference section are set in correspondence with each other. Although FIG. 2 illustrates a table structure having a page number column 40 and a difference number column 42, a structure of another form may be used so long as they are set in correspondence with each other. In the first exemplary embodiment, a value (e.g., "difference 1") shown in the difference number column 42 indicates one difference section. Alternatively, the "difference 1" may be a value indicating a region-of-interest that includes one or multiple difference sections. If multiple difference sections are included in one region-of-interest, it is desirable that the number of difference sections be set in association with each value shown in the difference number column 42.

The difference information shown in FIG. 2 indicates that a first page of the difference display document includes three difference sections, namely, differences 1 to 3, a second page includes one difference section, namely, a difference 4, and a fifth page includes one difference section, namely, a difference 5. Pages (pages 3 and 4) not included in the difference information do not have difference sections therein.

Figure 3:
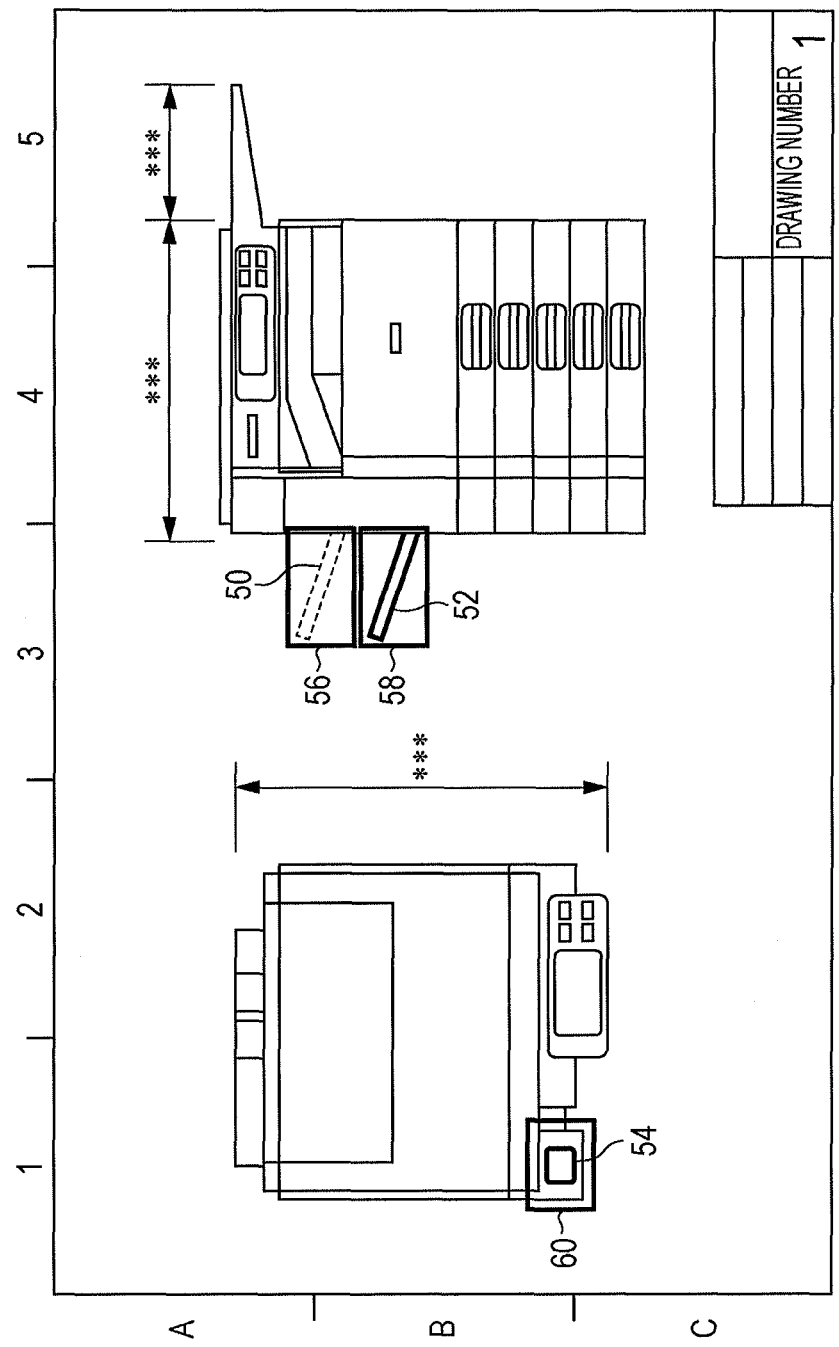
FIG. 3 illustrates a difference display document.

FIG. 3 illustrates the difference display document. The difference display document shown in FIG. 3 indicates difference sections in the contents of the pre-edited document 10. In FIG. 3, three difference sections are shown. A difference section 50 corresponds to a tray of the multifunction device denoted by a dotted line and indicates that the tray included in the pre-edited document 10 has been deleted in the edited document 12. A difference section 52 corresponds to a tray denoted by a bold line, and a difference section 54 corresponds to a recess denoted by a bold line. The difference sections 52 and 54 indicate that the tray and the recess not included in the pre-edited document 10 have been added in the edited document 12. Although not included in FIG. 3, a portion where a color has been changed may be indicated as a difference section. In this case, the portion may be shown by, for example, hatching. The addition, deletion, and change may be indicated by employing another method, such as rendering an added portion with a red line, a deleted portion in blue, and an unchanged portion in black.

Furthermore, although regions-of-interest 56, 58, and 60 are shown in FIG. 3, the regions-of-interest 56, 58, and 60 are not actually displayed, but information indicating the positions and ranges thereof are included as information within the difference display document. Alternatively, the regions-of-interest 56, 58, and 60 may be actually displayed based on this information. As shown in FIG. 3, each of the regions-of-interest 56, 58, and 60 according to the first exemplary embodiment is a rectangular region including one difference section.

Figure 5A:
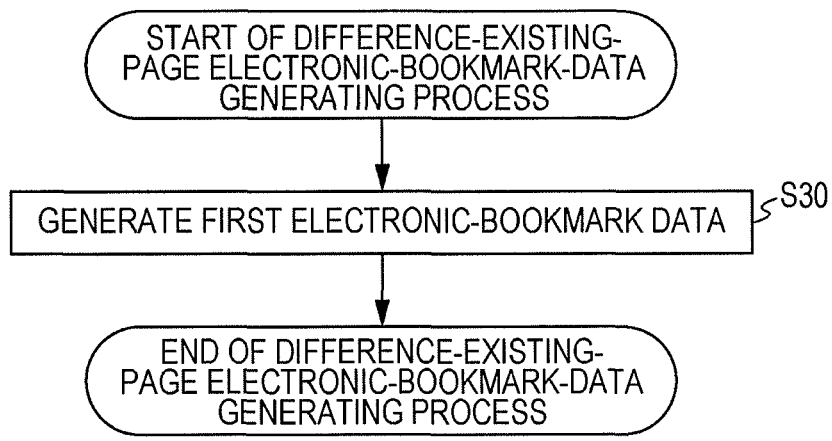
FIGS. 5A and 5B are flowcharts illustrating a process in step S18 according to the first exemplary embodiment in detail.
Figure 5B:
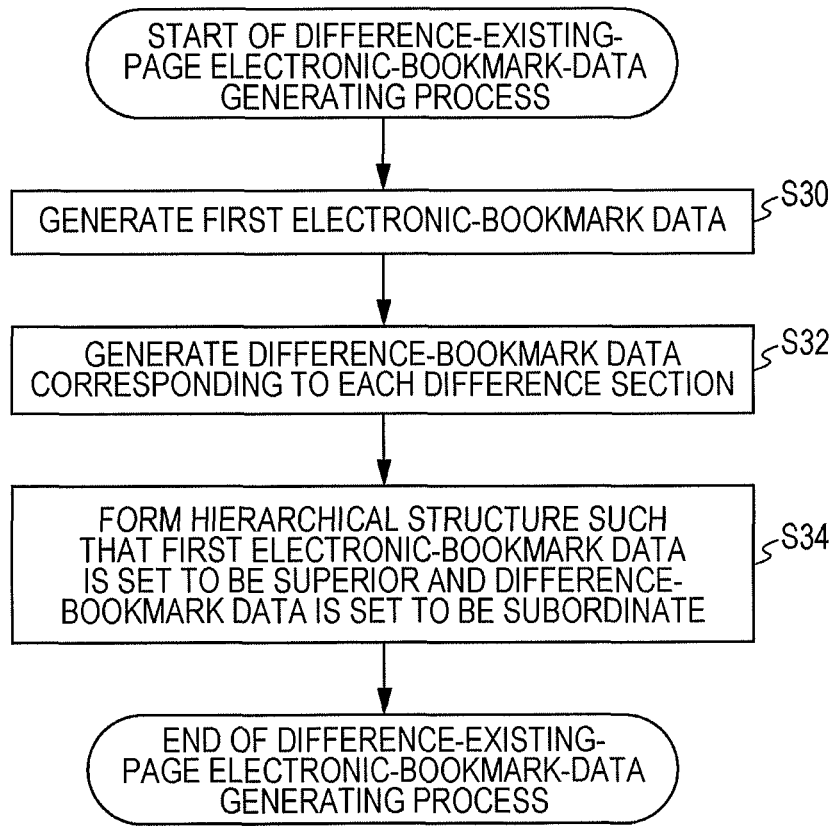

FIG. 4 is a flowchart illustrating the flow of a process according to the first exemplary embodiment. FIGS. 5A and 5B are flowcharts illustrating a process in step S18 according to the first exemplary embodiment in detail. The flowcharts in FIGS. 4 to 5B will be described below while referring to FIGS. 1 to 3.

In step S10, the difference-information acquiring unit 24 acquires difference information from the difference-information extracting unit 16.

In step S12, the difference-display-document acquiring unit 26 acquires a difference display document from the difference-display-document generating unit 18.

In step S14, a value n is initialized to 1. In this case, n denotes a variable indicating a page number of the difference display document.

In step S16, the electronic-bookmark adding unit 28 determines whether or not there is a difference section in an n-th page based on the difference information. The determination of whether or not there is a difference section in the n-th page is performed based on whether or not there is a value indicating the page number of the n-th page in the page number column 40 shown in FIG. 2.

If it is determined in step S16 that there is a difference section in the n-th page, the process proceeds to step S18. In step S18, the electronic-bookmark adding unit 28 generates difference-existing-page electronic-bookmark data to be added to the n-th page.

FIGS. 5A and 5B are flowcharts illustrating the process in step S18 according to the first exemplary embodiment in detail. Specifically, FIG. 5A illustrates the processing contents of step S18 according to the first exemplary embodiment, and FIG. 5B illustrates the processing contents of step S18 according to a modification of the first exemplary embodiment.

In step S30 in FIG. 5A, the electronic-bookmark adding unit 28 generates first electronic-bookmark data. The first electronic-bookmark data contains information indicating a page to which a first electronic bookmark is added as well as information indicating a bookmark name. In the first exemplary embodiment, the bookmark name of the first electronic bookmark is a page number (e.g., page 1) to which the first electronic bookmark is added. Alternatively, the number of difference sections included in the n-th page may be determined based on the difference information and be added to the page number as the bookmark name of the first electronic bookmark, so that the number of difference sections included in the page is included in the bookmark name of the first electronic bookmark. For example, a bookmark name of "page 1 (3)" may be set, such that "(3)" indicates that there are three difference sections in the first page. In the difference information, if a value (e.g., "difference 1") in the difference number column 42 is a value indicating a region-of-interest that includes multiple difference sections, it is desirable that the number of difference sections be determined in view of information related to the number of difference sections included in the region-of-interest.

Referring back to FIG. 4, if it is determined in step S16 that there is no difference section in the n-th page, the process proceeds to step S20. In step S20, the electronic-bookmark adding unit 28 generates second electronic-bookmark data as no-difference-page electronic-bookmark data. In this specification, a no-difference-page electronic bookmark is synonymous with a second electronic bookmark. Similar to the first electronic-bookmark data, the second electronic-bookmark data contains information indicating a page to which the second electronic bookmark is to be added as well as information indicating a bookmark name.

At least one of the first electronic-bookmark data and the second electronic-bookmark data desirably has information with which the display controller 30 may subsequently distinguish the two items of the electronic-bookmark data from each other. Furthermore, information indicating the display modes of the first and second electronic bookmarks, such as information indicating that the bookmark name of the first electronic bookmark is to be displayed in black and the bookmark name of the second electronic bookmark is to be displayed in gray, may be contained in the first electronic-bookmark data and the second electronic-bookmark data.

In step S22, the electronic-bookmark adding unit 28 determines whether or not the n-th page is the final page of the difference display document. The determination of whether or not the n-th page is the final page of the difference display document may be performed based on information included in the difference display document or may be performed based on information related to the number of pages in the difference display document included in the difference information.

If it is determined in step S22 that the n-th page is not the final page, the process proceeds to step S24 where n is incremented, and the process returns to step S16 again. Specifically, it is determined whether or not there is a difference section in one subsequent page, and a process similar to the above is performed thereafter.

If it is determined in step S22 that the n-th page is the final page, the process proceeds to step S26. In step S26, the electronic-bookmark adding unit 28 combines the generated electronic-bookmark data with the difference display document. Specifically, the electronic-bookmark adding unit 28 combines the electronic-bookmark data such that the corresponding electronic bookmark generated in step S18 or step S20 is added to each page of the difference display document.

In step S28, the display controller 30 displays the first electronic bookmark corresponding to the first electronic-bookmark data and the second electronic bookmark corresponding to the second electronic-bookmark data on the display unit 34. It is desirable that the contents of the difference display document be simultaneously displayed. The display controller 30 displays the first electronic bookmark and the second electronic bookmark in a visually distinguishable manner. For example, the font of the bookmark name of a difference-existing-page electronic bookmark is displayed in dark black, whereas the font of the bookmark name of a no-difference-page electronic bookmark is displayed in light gray, so that the two types of electronic bookmarks are distinguishable from each other. Alternatively, for example, the bookmark name of a difference-existing-page electronic bookmark may be displayed in a bold-faced font, whereas the bookmark name of a no-difference-page electronic bookmark may be displayed in an italic font. As another alternative, for example, the electronic bookmarks may individually be given icons, and the icons may be displayed in different colors or shapes. In other words, any method is permissible so long as the two types of electronic bookmarks are displayed in a distinguishable manner.

Figure 6:
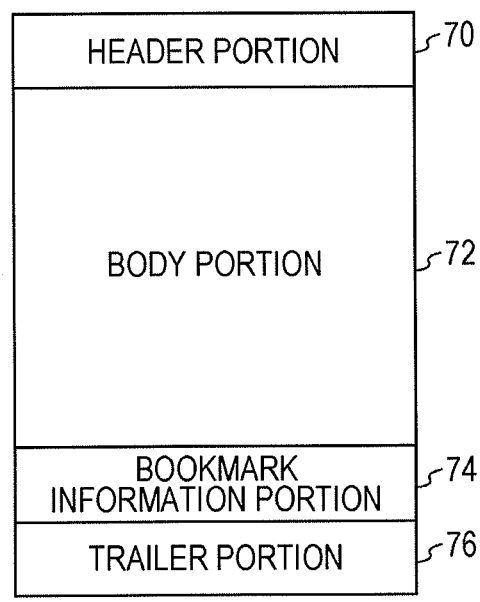
FIG. 6 illustrates a data structure of the difference display document having electronic bookmarks added thereto.

FIG. 6 illustrates a data structure of the difference display document having the electronic bookmarks added thereto. The difference display document includes a header portion 70 containing, for example, file version information, a body portion 72 containing actual data, such as the contents of an electronic document and difference-section information, a bookmark information portion 74 containing electronic-bookmark-related information, and a trailer portion 76 containing comprehensive data of the document file.

The bookmark information portion 74 contains the electronic-bookmark data generated by the electronic-bookmark adding unit 28. Furthermore, the bookmark information portion 74 may contain information related to a difference section corresponding to each electronic bookmark. The information related to a difference section corresponding to each electronic bookmark is, for example, positional information of the corresponding difference section, a range of a region-of-interest that includes the corresponding difference section, or information related to the type of difference. An example in which the bookmark information portion 74 contains these pieces of information will be described in other exemplary embodiments (i.e., third to fifth exemplary embodiments).

Figure 7:
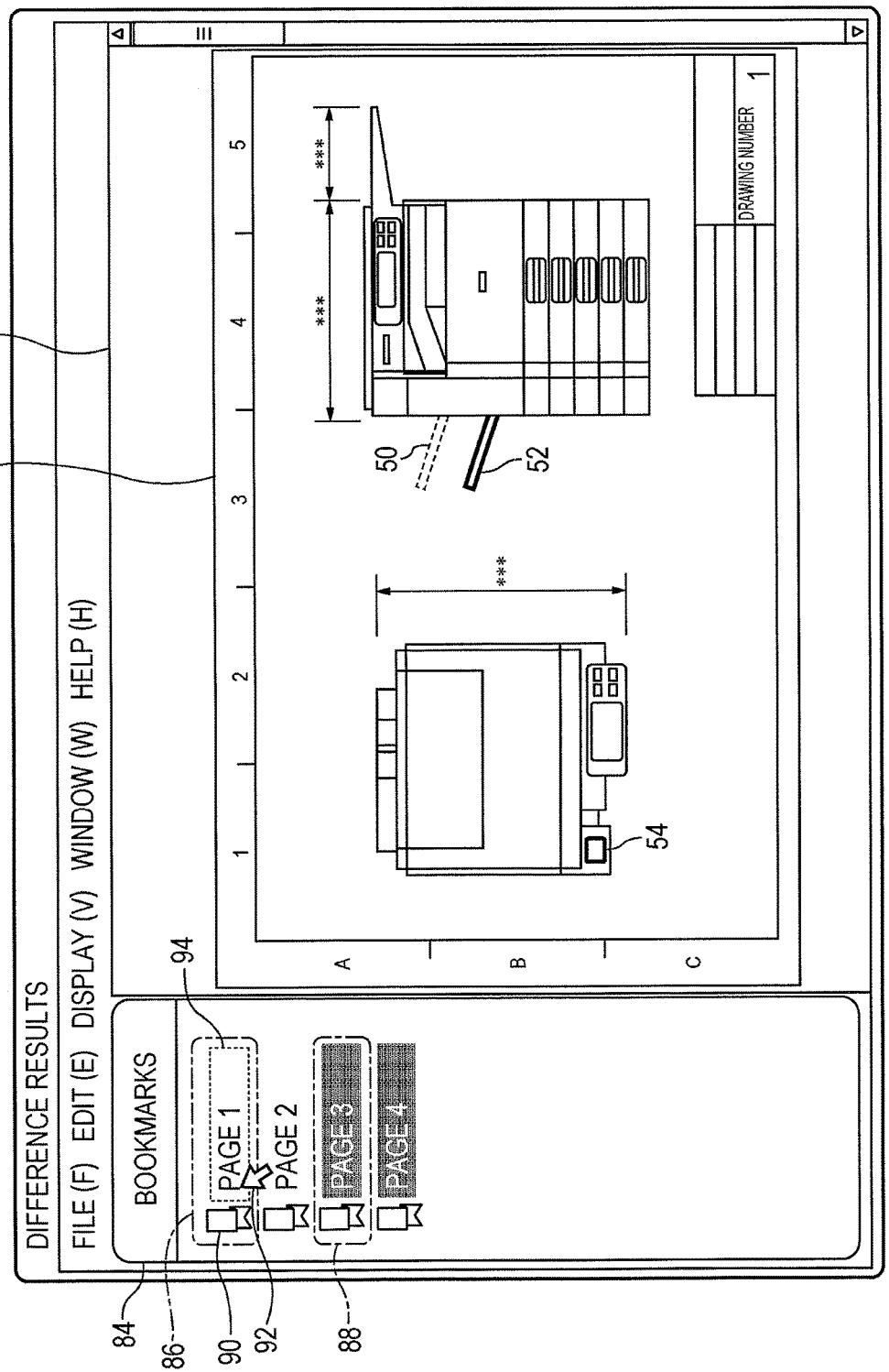
FIG. 7 illustrates a state where the difference display document having the electronic bookmarks added thereto is displayed in the first exemplary embodiment.

FIG. 7 illustrates a state where the difference display document having the electronic bookmarks added thereto is displayed in the first exemplary embodiment. The difference display document is displayed by an appropriate application. When the difference display document is opened by the appropriate application, a difference display document 82 is displayed in a display frame 80 located at the right side. Then, first electronic bookmarks 86, which are difference-existing-page electronic bookmarks, and second electronic bookmarks 88, which are no-difference-page electronic bookmarks, are displayed in a bookmark display portion 84 located at the left side. The first electronic bookmarks 86 and the second electronic bookmarks 88 each include a bookmark icon 90. By bringing a pointer 92 to one of the first electronic bookmarks 86, the second electronic bookmarks 88, and the bookmark icons 90 and clicking thereon, a page corresponding to the selected bookmark is displayed in the display frame 80. The positions of the display frame 80 and the bookmark display portion 84 are not limited to those in the above example. The display frame 80 and the bookmark display portion 84 may be displayed at arbitrary positions.

In the example shown in FIG. 7, the bookmark names of the first electronic bookmarks 86 are each displayed in black characters on a white background, whereas the bookmark names of the second electronic bookmarks 88 are each displayed in white characters on a gray background. Thus, the two types of electronic bookmarks are distinguishable from each other. Specifically, the bookmark display portion 84 indicates that difference sections exist in the first and second pages, and that there are no difference sections in the third and fourth pages. A frame 94 shown around an electronic bookmark name indicates a page currently displayed in the display frame 80.

FIG. 5B illustrates the flow of a process according to a modification of the first exemplary embodiment. This modification only differs from the first exemplary embodiment in terms of the process in step S18, while other configurations and processing contents are similar thereto. Therefore, redundant descriptions will be omitted. In this modification, a difference bookmark is generated in correspondence with each difference section. In this modification, the difference-existing-page electronic-bookmark data contains first electronic-bookmark data and difference-bookmark data.

In FIG. 5B, step S30 is the same as that shown in FIG. 5A in that first electronic-bookmark data is generated for each page having a difference section or sections. In step S32, the electronic-bookmark adding unit 28 generates difference-bookmark data corresponding to each difference section based on the difference information. With reference to the difference information shown in FIG. 2 as an example, difference-bookmark data is generated in correspondence with each row of the table structure shown in FIG. 2. Each item of difference-bookmark data contains information for identifying a page in which the corresponding difference section exists. In the difference information, if a value in the difference number column 42 is a value indicating a region-of-interest that includes multiple difference sections, it is desirable that items of difference-bookmark data equal in number to the number of difference sections included in the region-of-interest be generated.

In step S34, the electronic-bookmark adding unit 28 forms a hierarchical structure in which the first electronic-bookmark data generated in step S30 is set to be superior, whereas the difference-bookmark data generated in step S32 is set to be subordinate. The first electronic-bookmark data that is superior to the difference-bookmark data is generated for each page having the difference section or sections corresponding to the difference-bookmark data. For example, three items of difference-bookmark data generated in correspondence with the differences 1 to 3 based on the difference information in FIG. 2 are positioned as subordinates to the first electronic-bookmark data corresponding to the first page.

In this modification, a process similar to that described above is performed in steps S22 to S26. In step S28, the difference bookmark or bookmarks corresponding to the difference-bookmark data is/are displayed together with the first and second electronic bookmarks.

Figure 8:
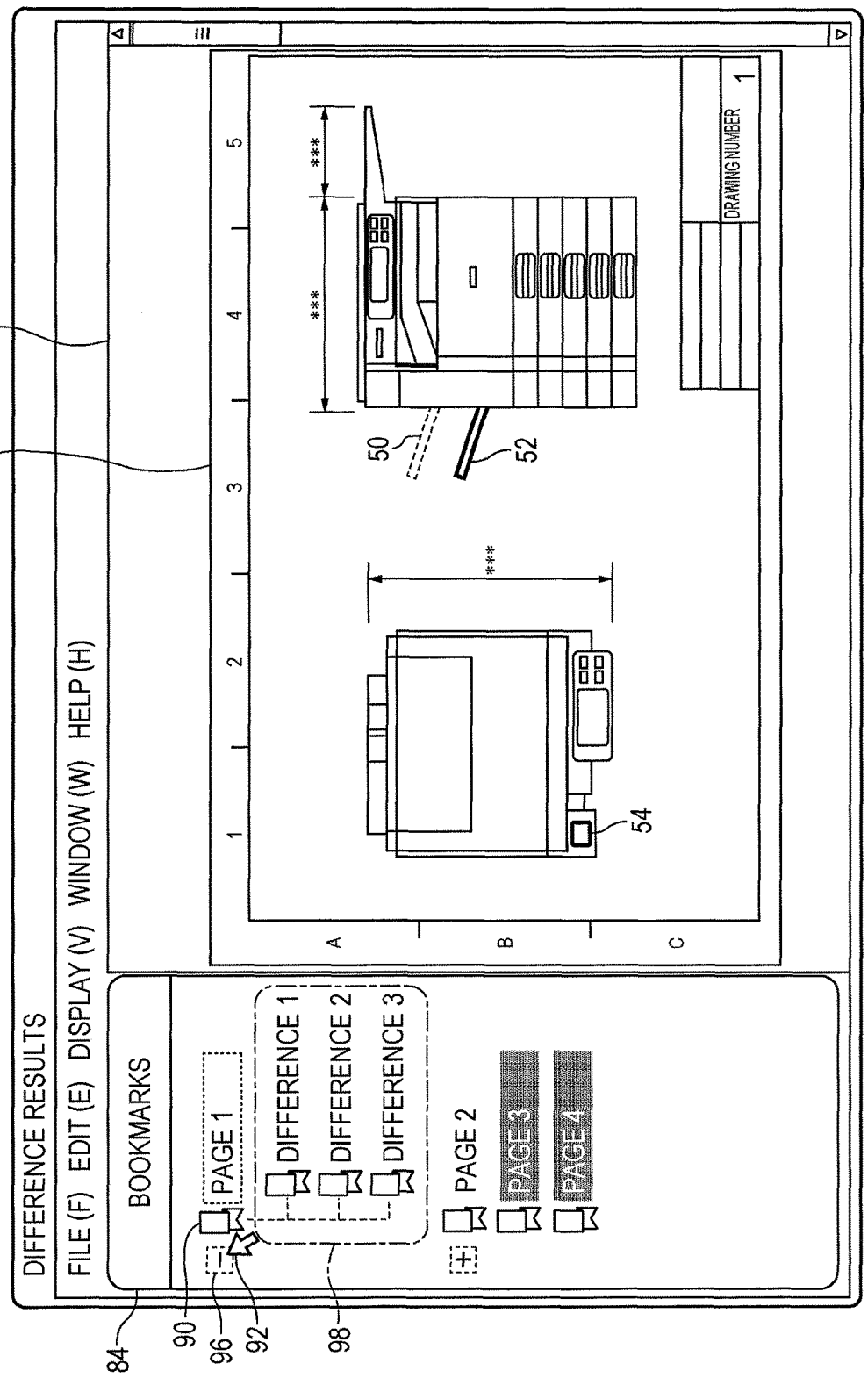
FIG. 8 illustrates a state where the difference display document having the electronic bookmarks added thereto is displayed in a modification of the first exemplary embodiment.

FIG. 8 illustrates a state where the difference display document having the electronic bookmarks added thereto is displayed in this modification of the first exemplary embodiment. In this modification, an extension icon 96 is displayed near the bookmark icon 90 of each first electronic bookmark in the bookmark display portion 84. When the extension icon 96 is clicked by using the pointer 92, difference bookmarks 98 positioned as subordinates to the first electronic bookmark are displayed such that the hierarchical structure is clearly shown. In FIG. 8, the hierarchical structure is indicated by a dotted line extending from the bookmark icon 90 of the superior first electronic bookmark to each difference bookmark 98. The display mode of the difference bookmarks 98 is desirably the same as that of the first electronic bookmark.

According to the first exemplary embodiment, in a difference display document having multiple pages, pages that include difference sections or the number of difference sections included in each page may be ascertained by simply checking the bookmark display portion 84. Furthermore, by generating a difference bookmark in correspondence with each difference section and displaying a hierarchical structure between the difference bookmarks and a first electronic bookmark, pages that include difference sections or the number of difference sections included in each page may be visually ascertained.

Second Exemplary Embodiment

In a second exemplary embodiment, the configuration of the image processing apparatus 20 and the peripheral devices thereof is the same as that in the first exemplary embodiment. In all of multiple exemplary embodiments to be described below, the configuration of the image processing apparatus 20 and the peripheral devices thereof is the same as that in the first exemplary embodiment.

Figure 9:
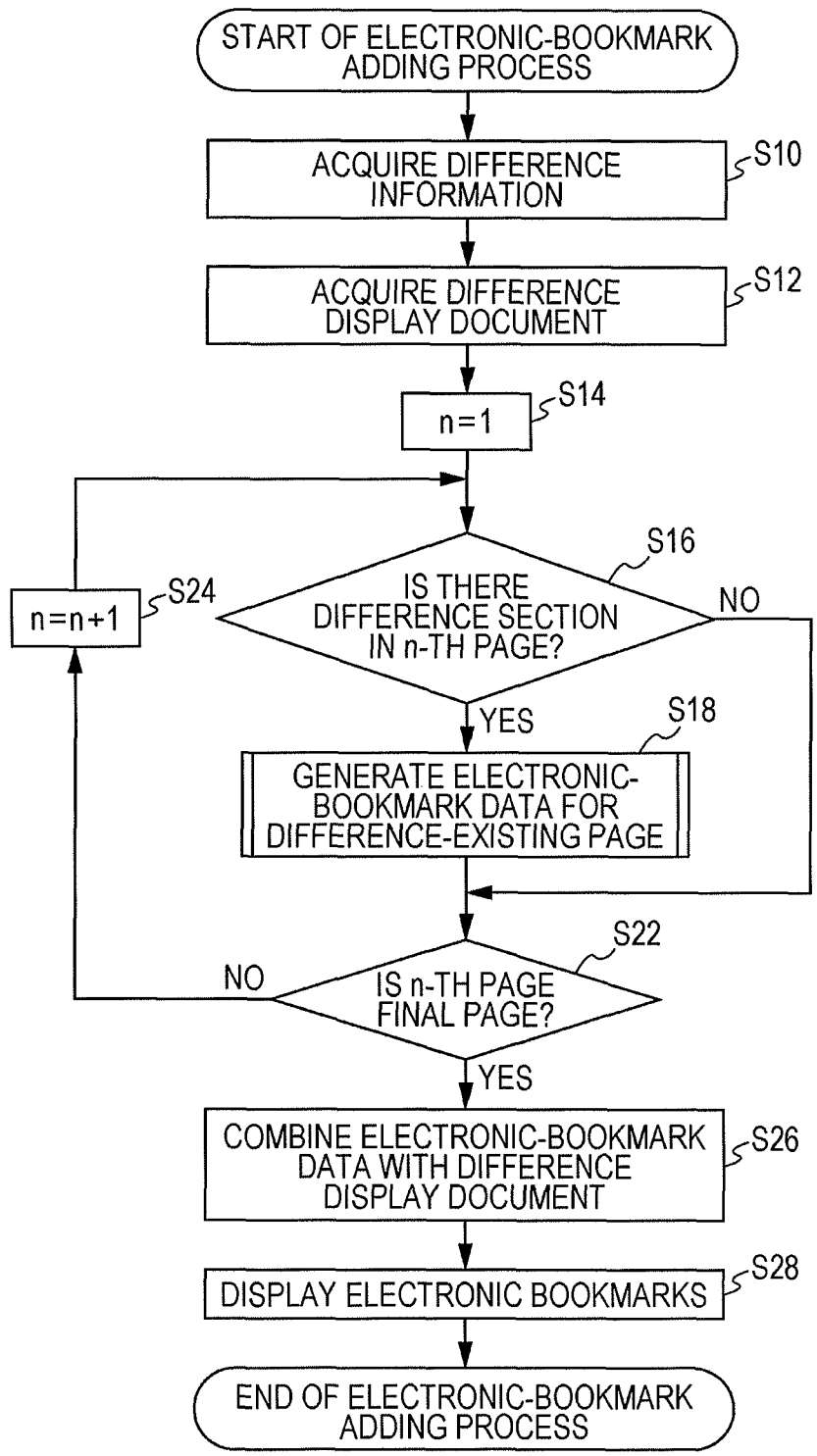
FIG. 9 is a flowchart illustrating the flow of a process according to a second exemplary embodiment.

FIG. 9 is a flowchart illustrating the flow of a process according to the second exemplary embodiment. By comparing FIG. 4 and FIG. 9, it is clear that the flowchart shown in FIG. 9 simply does not have step S20 in the flowchart shown in FIG. 4, while the remaining steps are entirely the same as those in the first exemplary embodiment. Therefore, descriptions regarding these steps will be omitted.

Although the second exemplary embodiment is similar to the first exemplary embodiment in that difference-existing-page electronic-bookmark data is generated for each page having a difference section or sections, the second exemplary embodiment is different from the first exemplary embodiment in that electronic-bookmark data is not generated for a page that does not have a difference section.

For example, it is assumed that, when a difference display document has several tens of pages or the number of pages thereof exceeds 100, there are only several difference sections existing in all of the pages. If electronic bookmarks added to all of the pages are entirely displayed, the display may become complicated. In this case, in the second exemplary embodiment, electronic bookmarks are added only to pages having difference sections, so that the number of added electronic bookmarks is reduced, whereby the bookmark display portion 84 may be simplified. Furthermore, since electronic bookmarks are only added to pages having difference sections, the pages having difference sections and pages not having difference sections may be distinguished from each other more clearly.

Third Exemplary Embodiment

A third exemplary embodiment is similar to the first and second exemplary embodiments in that a first electronic bookmark and a difference bookmark are added to each page that has a difference section, and that information used for performing a process for highlighting the position of the difference section within the page having the difference section is set in association with the difference bookmark. Thus, the page having the difference section may be readily identified, and the position of the difference section within the page may be readily identified.

FIG. 10 illustrates a data structure of difference information according to the third exemplary embodiment. In addition to the information included in the difference information according to the first and second exemplary embodiments, the difference information according to the third exemplary embodiment includes positional information indicating the position of a difference section and region-range information indicating the range of a region-of-interest including the difference section, which are set in correspondence with the difference section. As shown in FIG. 10, in the third exemplary embodiment, the difference information has a table structure. The table includes a page number column 40, a positional information column 100, a region-range information column 102, and a difference number column 42. Similar to the first exemplary embodiment, the difference information may have a structure other than the table structure so long as the above pieces of information are set in correspondence with one another.

A value in the positional information column 100 is information indicating the position of a difference section within a page. For example, the position of a difference section is expressed with coordinate information including an x coordinate and a y coordinate. Since a difference section normally includes the coordinates of one or more coordinate points, the coordinates indicating the position of the difference section in the third exemplary embodiment are coordinates of a central point of the difference section. For example, if a difference section is a line segment that connects coordinates (0, 0) and (6, 6), the coordinates indicating the position of that difference section are (3, 3). Needless to say, a value in the positional information column 100 may be coordinates obtained by other methods so long as the position of a difference section is identifiable. Furthermore, in the difference information, if a value in the difference number column 42 is a value indicating a region-of-interest that includes multiple difference sections, a value in the positional information column 100 may be coordinates of a central point of the corresponding region-of-interest.

A value in the region-range information column 102 is information indicating a range of a region-of-interest that includes a difference section. In the third exemplary embodiment, since a region-of-interest is rectangular, the coordinates of two points, namely, an upper right point and a lower left point, of the region-of-interest is used as the information indicating the range of the region-of-interest. This is because, when a region-of-interest is rectangular, a rectangular range is identifiable based on the coordinates of the upper right point and the lower left point thereof (or the upper left point and the lower right point thereof), that is, the coordinates of opposing corners of the rectangle. The region-range information may be a value in another form, such as information indicating the lengths in the x-axis direction and the y-axis direction with respect to a coordinate value included in the positional information column 100 as the center.

Figure 11:
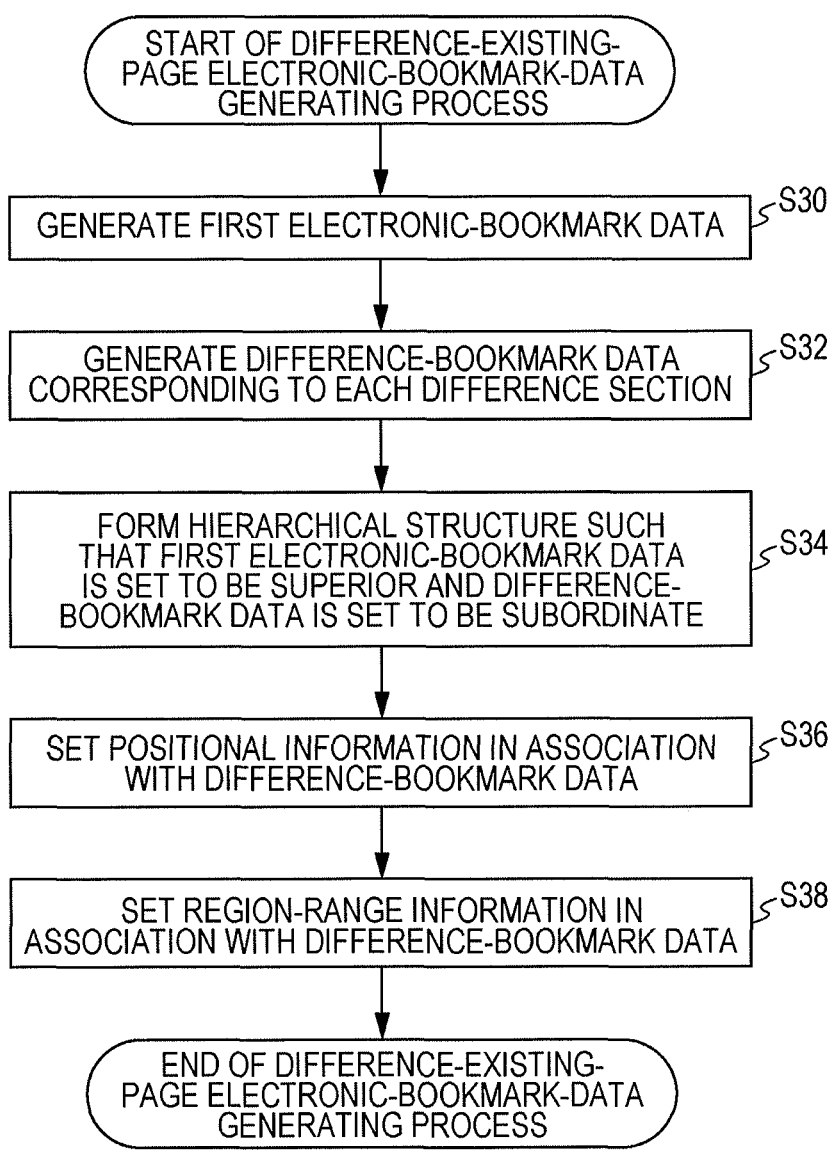
FIG. 11 is a flowchart illustrating a process in step S18 according to the third exemplary embodiment in detail.

FIG. 11 is a flowchart illustrating a process in step S18 according to the third exemplary embodiment in detail. In the third exemplary embodiment, the steps according to the first exemplary embodiment shown in FIG. 4 are similarly performed, and only the processing contents of step S18 are different therefrom. Therefore, descriptions regarding steps similar to those in the first exemplary embodiment will be omitted, and only step S18 will be described below.

Steps S30 to S34 in FIG. 11 are similar to those shown in FIG. 5B.

In step S36, based on the difference information shown in FIG. 10, the electronic-bookmark adding unit 28 adds positional information of the difference section to the difference-bookmark data generated in step S32. For example, when positional information is to be added to the difference-bookmark data corresponding to the difference 1, coordinate information (xxx1, yyy1) indicating the position of the difference section set in correspondence with the difference 1 is determined based on the difference information shown in FIG. 10, and the determined coordinate information (xxx1, yyy1) is added to the difference-bookmark data.

In step S38, based on the difference information shown in FIG. 10, the electronic-bookmark adding unit 28 adds region-range information indicating the range of a region-of-interest including the difference section to the difference-bookmark data generated in step S32. For example, when region-range information is to be added to the difference-bookmark data corresponding to the difference 1, coordinates (xxx2, yyy2) and coordinates (xxx2', yyy2'), which are the region-range information set in correspondence with the difference 1, are determined based on the difference information shown in FIG. 10, and the determined coordinates are added to the difference-bookmark data. Subsequently, a process similar to that in the first exemplary embodiment is performed in steps S22 to S26.

Figure 12:
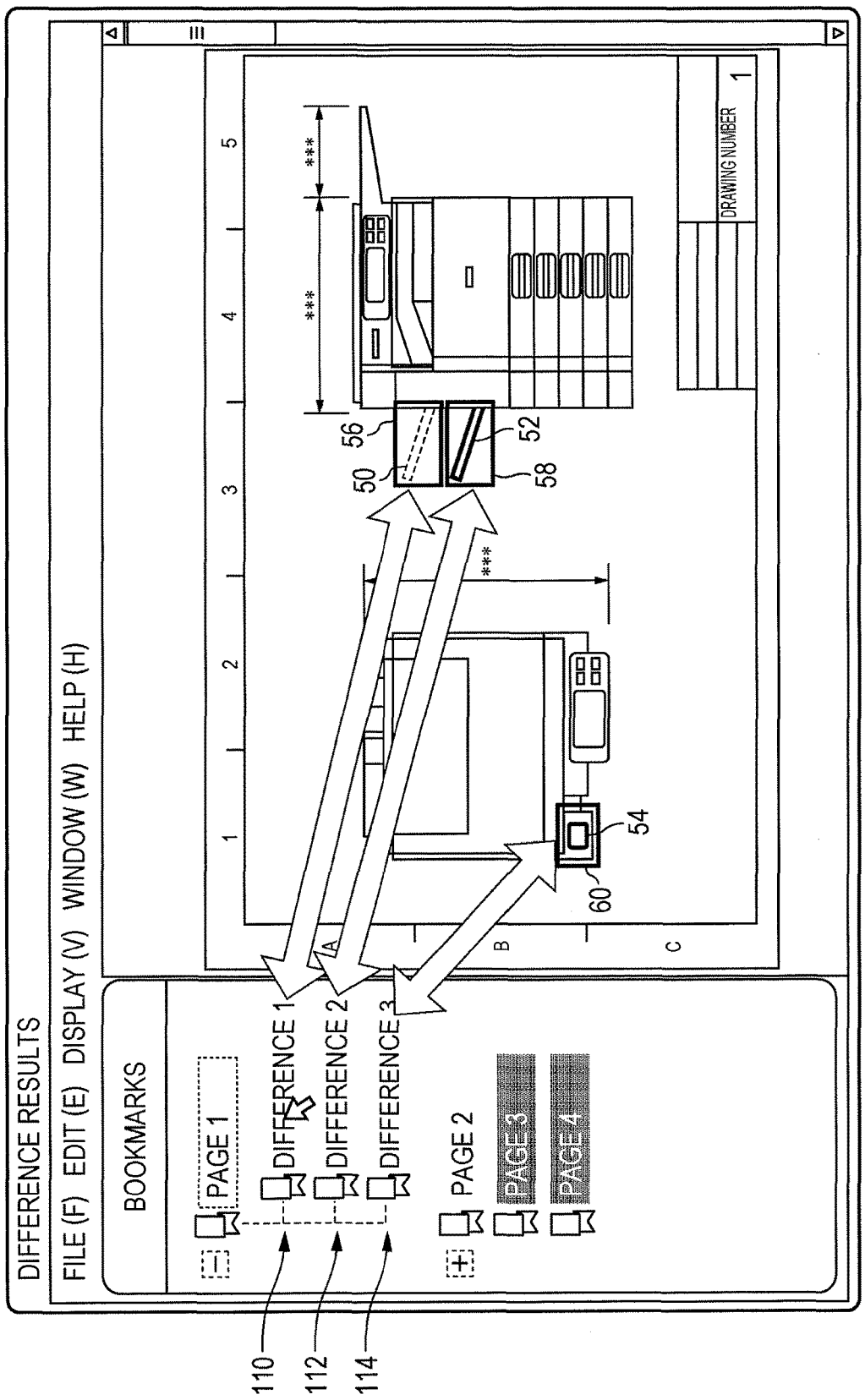
FIG. 12 illustrates a correspondence relationship between a difference bookmark and a difference section.

FIG. 12 illustrates a correspondence relationship between a difference bookmark and a difference section. As shown in FIG. 12, three difference bookmarks 110, 112, and 114 are added to the first page. The difference bookmark 110 corresponds to the difference section 50 or the region-of-interest 56, the difference bookmark 112 corresponds to the difference section 52 or the region-of-interest 58, and the difference bookmark 114 corresponds to the difference section 54 or the region-of-interest 60. Each of the arrows shown in FIG. 12 indicates the concept of the correspondence relationship but is not actually displayed.

Figure 13:
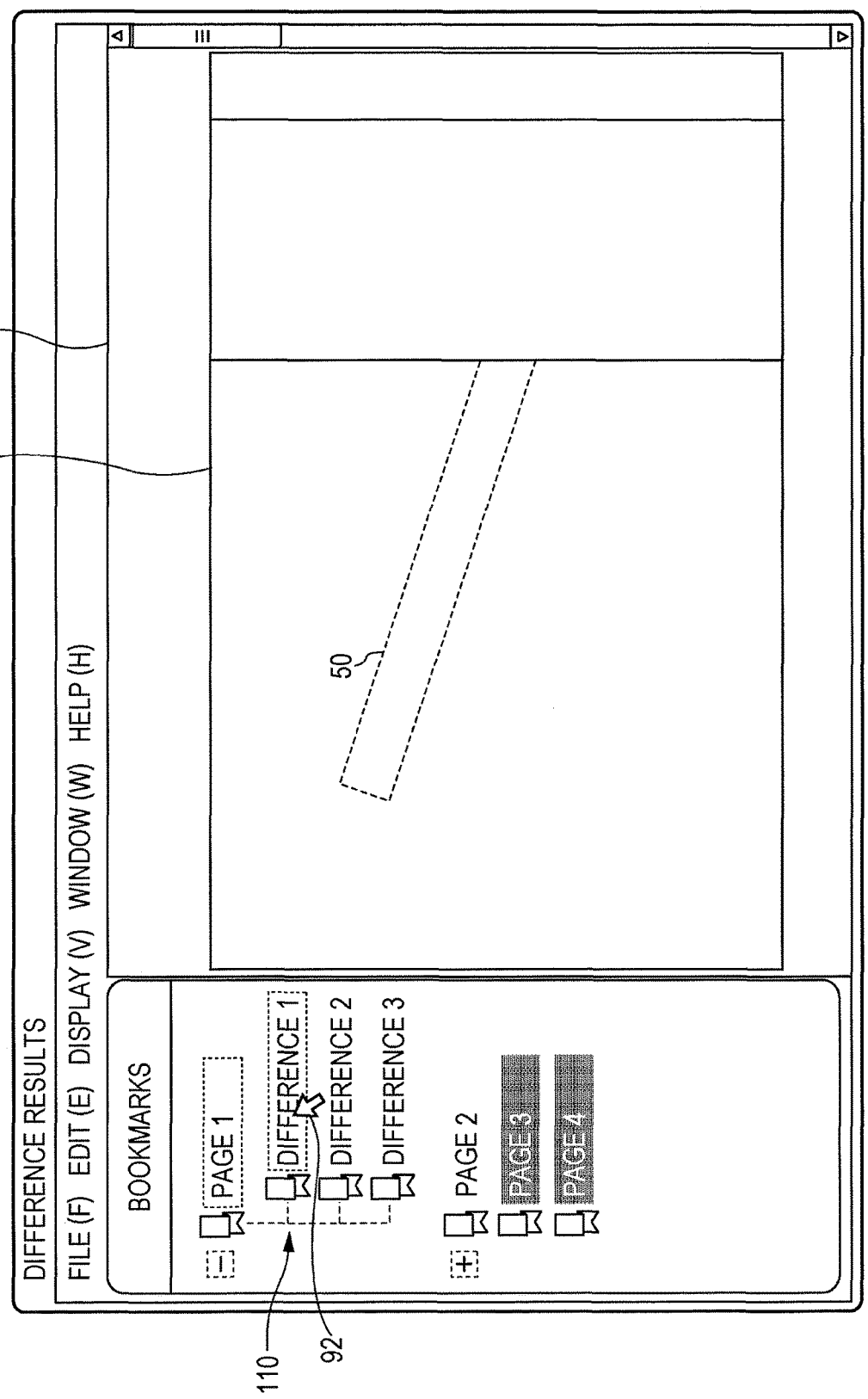
FIG. 13 illustrates a state where a difference section is highlighted.

FIG. 13 illustrates a state where a difference section is highlighted. When the difference bookmark 110 is clicked by using the pointer 92, the display controller 30 performs a process for expanding the position indicated by the positional information (included in the difference-bookmark data corresponding to the difference bookmark 110) set in association with the difference bookmark 110 and for displaying an expanded difference section 120 in the display frame 80. The expansion display process will be described below with reference to a flowchart.

Figure 14:
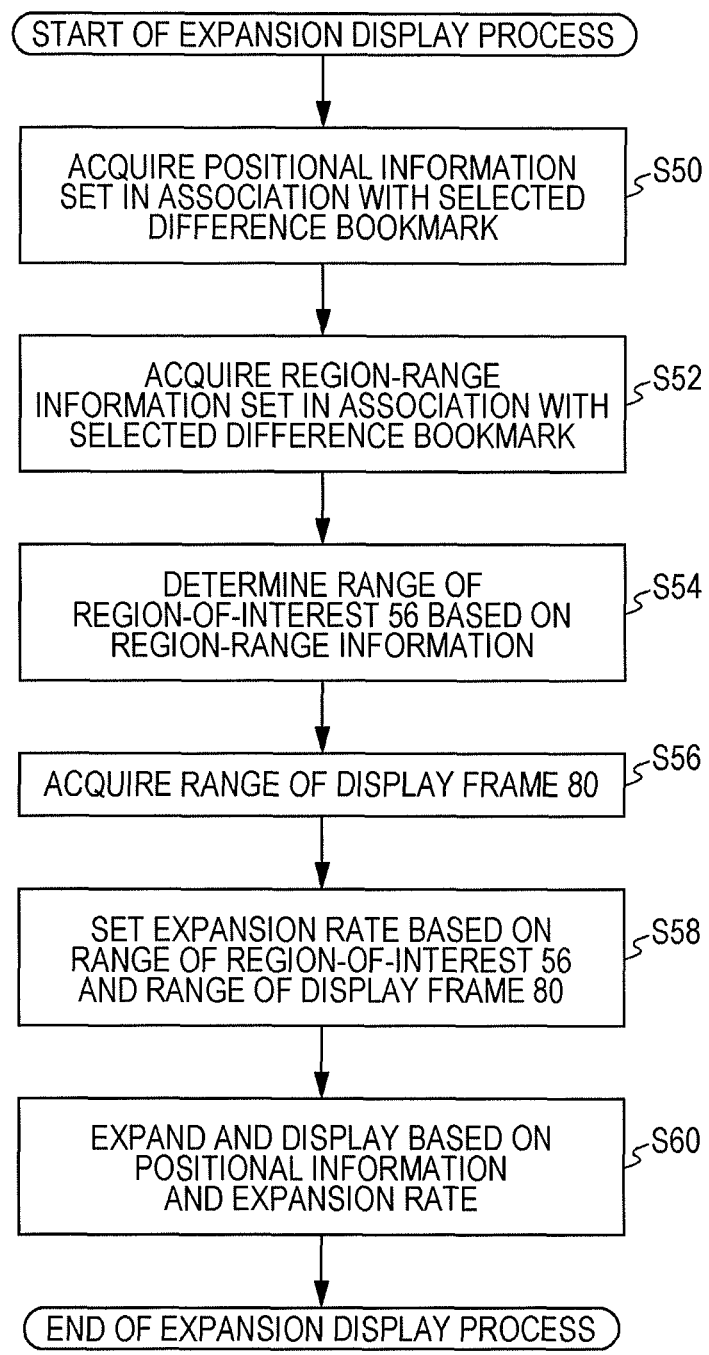
FIG. 14 is a flowchart illustrating an expansion display process in detail.

FIG. 14 is a flowchart illustrating the expansion display process in detail. In step S50, when the difference bookmark 110 is clicked, the display controller 30 acquires positional information (xxx1, yyy1) set in association with the difference bookmark 110. Based on the acquired positional coordinates, central coordinates of a section to be expanded and displayed are determined.

In step S52, the display controller 30 acquires coordinates (xxx2, yyy2) and coordinates (xxx2', yyy2'), which are region-range information set in association with the difference bookmark 110.

In step S54, the display controller 30 determines a rectangular range indicating the region-of-interest 56 based on the acquired region-range information. Specifically, the lengths of long and short sides of the region-of-interest 56 are determined based on the two pieces of coordinate information as the region-range information.

In step S56, the display controller 30 acquires information indicating the current range of the display frame 80 in which the difference display document is displayed. The size of the display frame 80 is arbitrarily changeable by the operator. The information indicating the current range of the display frame 80 acquired in step S56 refers to information indicating a range of the display frame 80 when the expansion display process is performed in response to selection of the difference bookmark 110 using the pointer 92. Based on this information, the lengths of two orthogonal sides constituting the display frame 80 are determined.

In step S58, the display controller 30 sets an expansion rate based on the ratio between the range of the region-of-interest 56 and the current range of the display frame 80. Specifically, the ratio between the length of the long side of the region-of-interest 56 and the length of a side of the display frame 80 that is parallel to the long side, that is, the ratio of the length of the side of the display frame 80 that is parallel to the long side of the region-of-interest 56 to the length of the long side of the region-of-interest 56, is first determined and is set as a first rate. Likewise, the ratio between the length of the short side of the region-of-interest 56 and the length of a side of the display frame 80 that is parallel to the short side, that is, the ratio of the length of the side of the display frame 80 that is parallel to the short side of the region-of-interest 56 to the length of the short side of the region-of-interest 56, is determined and is set as a second rate. Of the first rate and the second rate, the smaller rate is selected and is set as the expansion rate. By setting the expansion rate in this manner, a maximum expansion rate that allows the entire range of the region-of-interest 56 to be displayed in the display frame 80 as much as possible is determined.

In step S60, the display controller 30 performs expansion display based on the expansion rate determined in step S58 with the coordinates indicated in the positional information acquired in step S50 as the center.

Although a difference section is expanded and displayed based on positional information and region-range information set in association with a difference bookmark in the third exemplary embodiment, a difference section may be highlighted based on positional information alone. For example, a difference section may be expanded based on a predetermined expansion rate. Specifically, for example, a process for setting the expansion rate may be performed between step S54 and step S58 in FIG. 14. Furthermore, as an alternative to the method of expanding a difference section, for example, a difference section may be highlighted by adding color to a predetermined range surrounding the difference section based on positional information.

Furthermore, although the expansion rate is determined based on the range of the region-of-interest 56 and the current range of the display frame 80 in the third exemplary embodiment, the expansion rate may be determined without referring to the current range of the display frame 80. In this case, for example, the range of the display frame 80 when the display frame 80 is maximized in an application that displays the difference display document is first determined based on the size of the display unit 34 or the display resolution in the display unit 34. Then, a difference section may be expanded based on an expansion rate determined based on the range of the region-of-interest 56 and the determined range of the display frame 80, and a process for automatically maximizing the display frame 80 may be performed in the application that displays the difference display document. Alternatively, after performing expansion based on an expansion rate according to the range of the region-of-interest 56 alone, the range of the display frame 80 may be automatically changed so that the expanded region-of-interest 56 is appropriately displayed.

According to the third exemplary embodiment, a page having a difference section may be readily identified, and the position of the difference section within the page may be readily identified. In addition, by setting the expansion rate based on the range of the region-of-interest 56 and the range of the display frame 80, the difference section may be expanded and displayed with an appropriate size.

Fourth Exemplary Embodiment

A fourth exemplary embodiment is similar to the first and second exemplary embodiments in that a first electronic bookmark and a difference bookmark are added to a page having a difference section, information indicating the type of difference section corresponding to the difference bookmark is added to the difference bookmark, and this information is displayed. Thus, the type of difference section may be readily identified.

FIG. 15 illustrates a data structure of difference information according to the fourth exemplary embodiment. The difference information according to the fourth exemplary embodiment is different from the difference information according to the third exemplary embodiment in terms of the contents of a difference number column 130. The difference number column 130 has values such as "deleted 1", "added 1", and "corrected 1", and these values express the types of difference sections.

Figure 16:
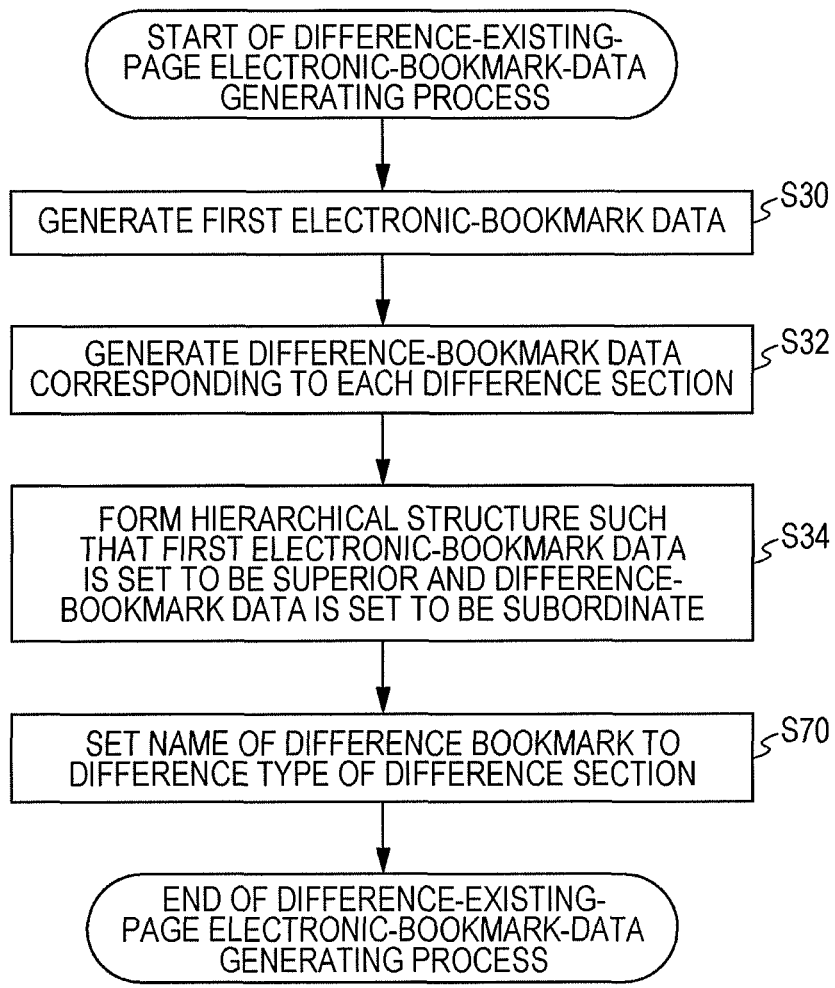
FIG. 16 is a flowchart illustrating a process in step S18 according to the fourth exemplary embodiment in detail.

FIG. 16 is a flowchart illustrating a process in step S18 according to the fourth exemplary embodiment in detail. In the fourth exemplary embodiment, the steps according to the first exemplary embodiment shown in FIG. 4 are similarly performed, and only the processing contents of step S18 are different therefrom. Therefore, descriptions regarding steps similar to those in the first exemplary embodiment will be omitted, and only step S18 will be described below.

Steps S30 to S34 in FIG. 16 are similar to those shown in FIG. 5B.

In step S70, based on the difference information shown in FIG. 15, the electronic-bookmark adding unit 28 sets the bookmark name in the difference-bookmark data generated in step S32 as a name expressing the type of the difference section. For example, it is assumed that the bookmark names of three difference bookmarks in the first page are "deleted 1", "added 1", and "added 2", respectively. Subsequently, a process similar to that in the first exemplary embodiment is performed in steps S22 to S26.

Figure 17:
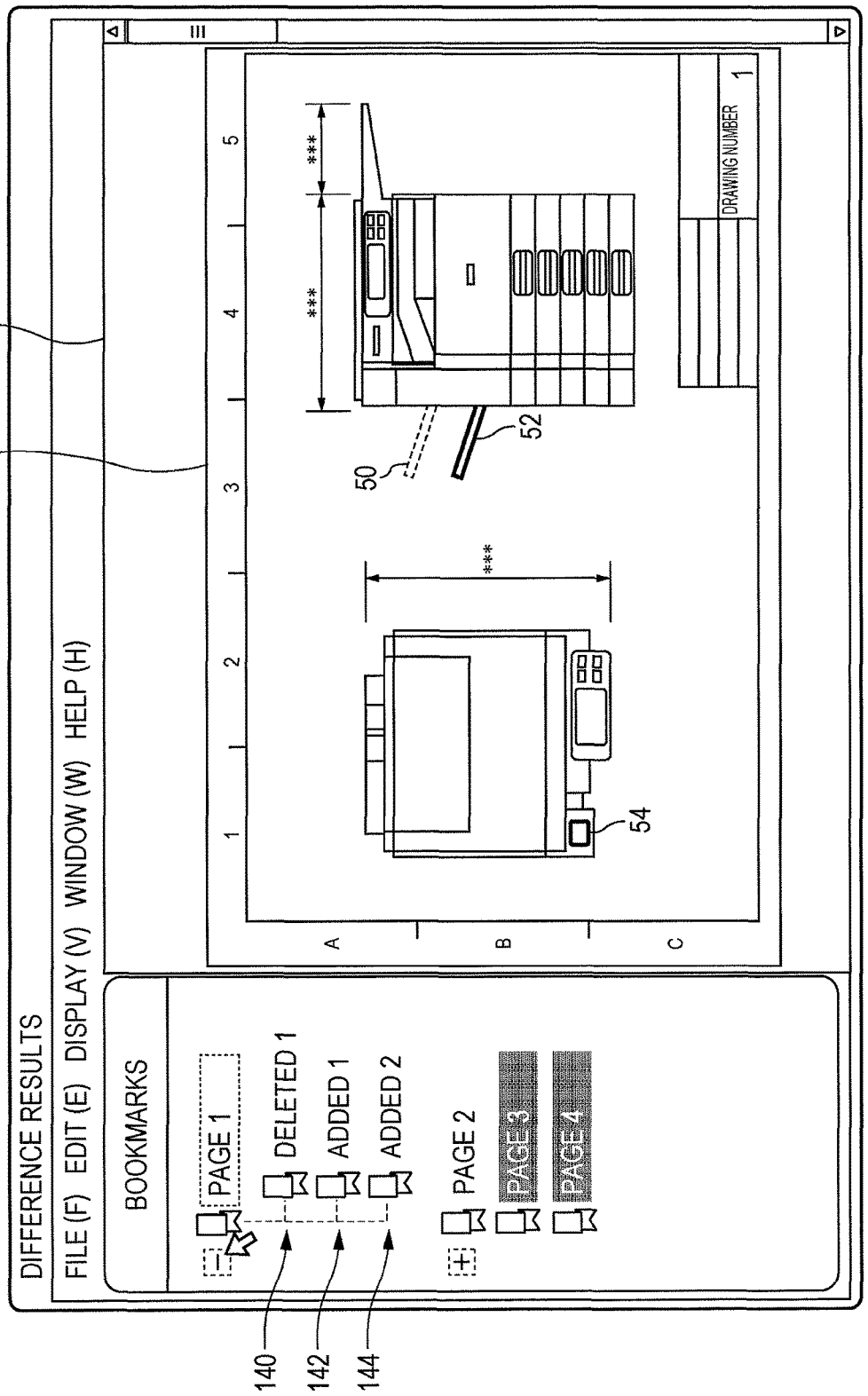
FIG. 17 illustrates a state where a difference display document having electronic bookmarks added thereto is displayed in the fourth exemplary embodiment.

FIG. 17 illustrates a state where a difference display document having electronic bookmarks added thereto is displayed in the fourth exemplary embodiment. As shown in FIG. 17, three difference bookmarks 140, 142, and 144 are added to the first page, and the types of difference sections included in the first page are identifiable based on the names of the respective difference bookmarks. Similar to the third exemplary embodiment, the difference bookmarks 140, 142, and 144 are respectively set in association with the difference sections 50, 52, and 54. For example, the difference section 50 is expanded and displayed when the difference bookmark 140 is clicked. As an alternative to expressing the types of difference sections by using bookmark names, for example, the types of difference sections may be expressed by using bookmark icons.

According to the fourth exemplary embodiment, the type of difference section included in each page may be identified by simply checking the contents displayed in the bookmark display portion 84.

Fifth Exemplary Embodiment

A fifth exemplary embodiment is similar to the first and second exemplary embodiments in that a first electronic bookmark is added to a page having a difference section, information indicating that editing, which includes addition, deletion, or interchange, has been performed on the page is added to the first electronic bookmark, and this information is displayed. Thus, it is possible to readily ascertain whether or not there is an edited page or to readily identify the contents of the editing and the position of the edited page.

Figure 18:
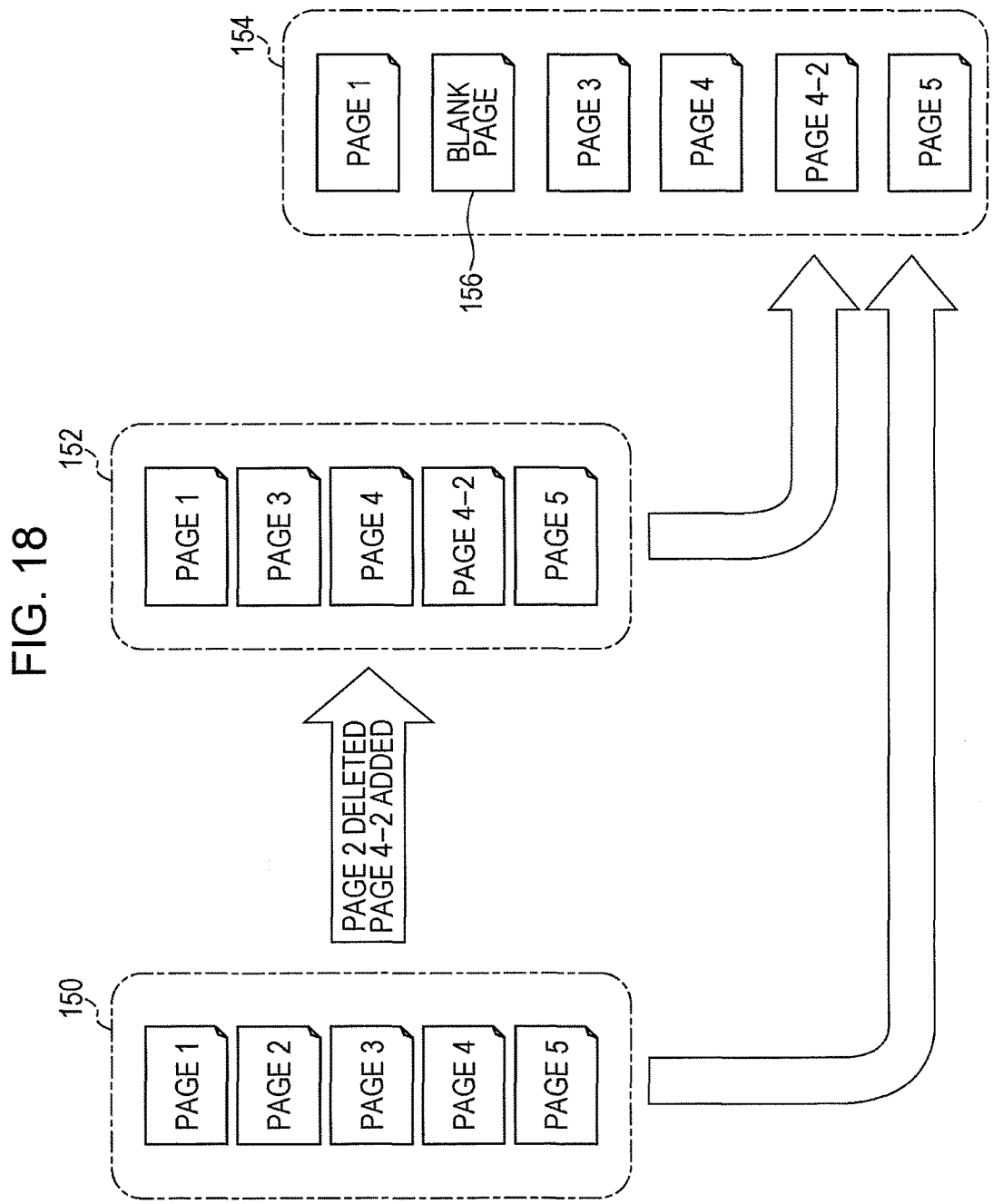
FIG. 18 illustrates page structures of pre-edited and edited documents.

FIG. 18 illustrates page structures of pre-edited and edited documents. As shown in FIG. 18, for example, when an edited document 152 is created by deleting page 2 from a pre-edited document 150, the difference-display-document generating unit 18 performs a process for inserting a blank page 156 in place of the deleted page 2 for generating a difference display document 154 with respect to the two documents. Furthermore, for example, when the edited document 152 is created by adding new page 4-2 between page 4 and page 5 of the pre-edited document 150, the difference-display-document generating unit 18 performs a process for inserting the added page 4-2 between page 4 and page 5 in the difference display document 154.

The determination of whether a page has been added or deleted is performed, for example, in the following manner. First, with respect to image data obtained by the image reading unit 14 reading the pre-edited document 150 and the edited document 152, the difference-information extracting unit 16 compares the first pages of the two documents so as to determine whether or not the number of matching pixels is larger than or equal to a predetermined value. If the number of matching pixels is larger than or equal to the predetermined value, it is determined that page-editing has not been performed on the first page. If the number of matching pixels is smaller than the predetermined value, the image data of the first page of the pre-edited document 150 is compared with the image data of the second page of the edited document 152 so as to determine whether or not the number of matching pixels is larger than or equal to the predetermined value. If the number of matching pixels is larger than or equal to the predetermined value, it is determined that a page has been added before the first page of the pre-edited document 150. If the number of matching pixels is smaller than the predetermined value, the image data of the first page of the pre-edited document 150 is further compared with the image data of the third page of the edited document 152. The determination process is continuously performed thereafter in this manner. After performing the determination process up to a predetermined page, if there is no page with matching pixels whose number is larger than or equal to the predetermined value, the process ends.

Furthermore, if the number of matching pixels is smaller than the predetermined value after comparing the first pages of the two documents, the difference-information extracting unit 16 further compares the image data of the second page of the pre-edited document 150 with the image data of the first page of the edited document 152 so as to determine whether or not the number of matching pixels is larger than or equal to the predetermined value. If the number of matching pixels is larger than or equal to the predetermined value, it is determined that the first page has been deleted from the pre-edited document 150. The determination process is continuously performed thereafter in a similar manner. After performing the determination process up to a predetermined page, if there is no page with matching pixels whose number is larger than or equal to the predetermined value, the process ends.

Furthermore, by combining the above-described processes, it may be determined whether a page in the pre-edited document 150 has been interchanged. For example, if the number of matching pixels is larger than or equal to the predetermined value when the image data of the first page of the pre-edited document 150 is compared with the image data of the second page of the edited document 152, and if the number of matching pixels is larger than or equal to the predetermined value when the image data of the second page of the pre-edited document 150 is compared with the image data of the first page of the edited document 152, it is determined that the first page and the second page of the edited document 152 have been interchanged with the first page and the second page of the pre-edited document 150.

FIG. 19 illustrates a data structure of difference information according to the fifth exemplary embodiment. The difference information according to the fifth exemplary embodiment is obtained by adding information indicating the contents of page-editing to the information included in the difference information according to the fourth exemplary embodiment. In the fifth exemplary embodiment, a page-editing column 160 is added as the information indicating the contents of page-editing. The page-editing column 160 includes a value indicating that a page has been added, deleted, or interchanged. In the fifth exemplary embodiment, the page-editing column 160 includes character strings of "added", "deleted", and "interchanged" as values. The difference information shown in FIG. 19 indicates that page 2 has been deleted, page 4-2 has been added, and pages 6 and 7 have been interchanged. With regard to an interchange, it is desirable that information indicating which of the pages has been interchanged with another be included. For example, it is desirable that a page number in the pre-edited document be added to a value in the page-editing column 160 so as to be set as "interchanged with 7" or "interchanged with 6".

As an alternative to adding the page-editing column 160, the information indicating the contents of page-editing may be included in, for example, the positional information column 100 or the region-range information column 102. For example, when coordinates (−1, −1) normally impossible in positional information are input, this may imply that the corresponding page has been deleted. When coordinates (−2, −2) are input, this may imply that the corresponding page has been added. When coordinates (−3, −3) are input, this may imply that the corresponding page has been interchanged. In this case, with regard to an interchange, it is desirable that information indicating a page number in the pre-edited document be added so that, for example, the coordinate values are set to (−37, −37).

Figure 20:
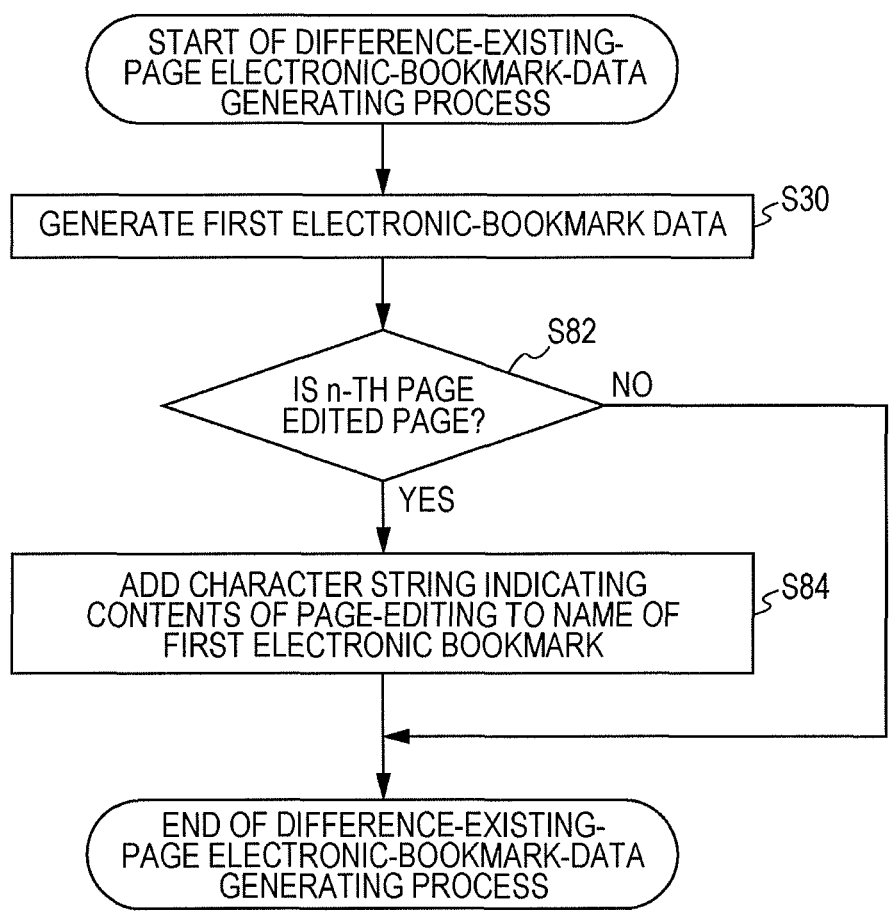
FIG. 20 is a flowchart illustrating a process in step S18 according to the fifth exemplary embodiment in detail.

FIG. 20 is a flowchart illustrating a process in step S18 according to the fifth exemplary embodiment in detail. In the fifth exemplary embodiment, the steps according to the first exemplary embodiment shown in FIG. 4 are similarly performed, and only the processing contents of step S18 are different therefrom. Therefore, descriptions regarding steps similar to those in the first exemplary embodiment will be omitted, and only step S18 will be described below.

Step S30 in FIG. 20 is similar to that shown in FIG. 5A.

In step S82, based on the difference information shown in FIG. 19, the electronic-bookmark adding unit 28 determines whether or not an n-th page is an edited page. For example, with regard to the determination performed on the first page, it is determined whether or not each row having the value "1" in the page number column 40 has "added", "deleted", or "interchanged" as a value in the page-editing column 160 in the difference information shown in FIG. 19. Since each row has none of the above, the determination result in step S82 indicates "NO". With regard to the determination performed on the second page, the same determination process is performed. Since the row having the value "2" in the page number column 40 has "deleted" as a value in the page-editing column 160, the determination result in step S82 indicates "YES".

In step S84, based on the difference information, the electronic-bookmark adding unit 28 adds information indicating the contents of page-editing to the bookmark name of the first electronic-bookmark data generated in step S30. In the fifth exemplary embodiment, the character string "added", "deleted", or "interchanged" as a value in the page-editing column 160 in the difference information is added to the bookmark name. With regard to an interchange, it is desirable that a page number prior to the interchange be further added. The information indicating the contents of page-editing may alternatively be added by, for example, changing a bookmark icon in accordance with the contents of page-editing or by changing the font or the color of the character string in accordance with the contents of page-editing.

Figure 21:
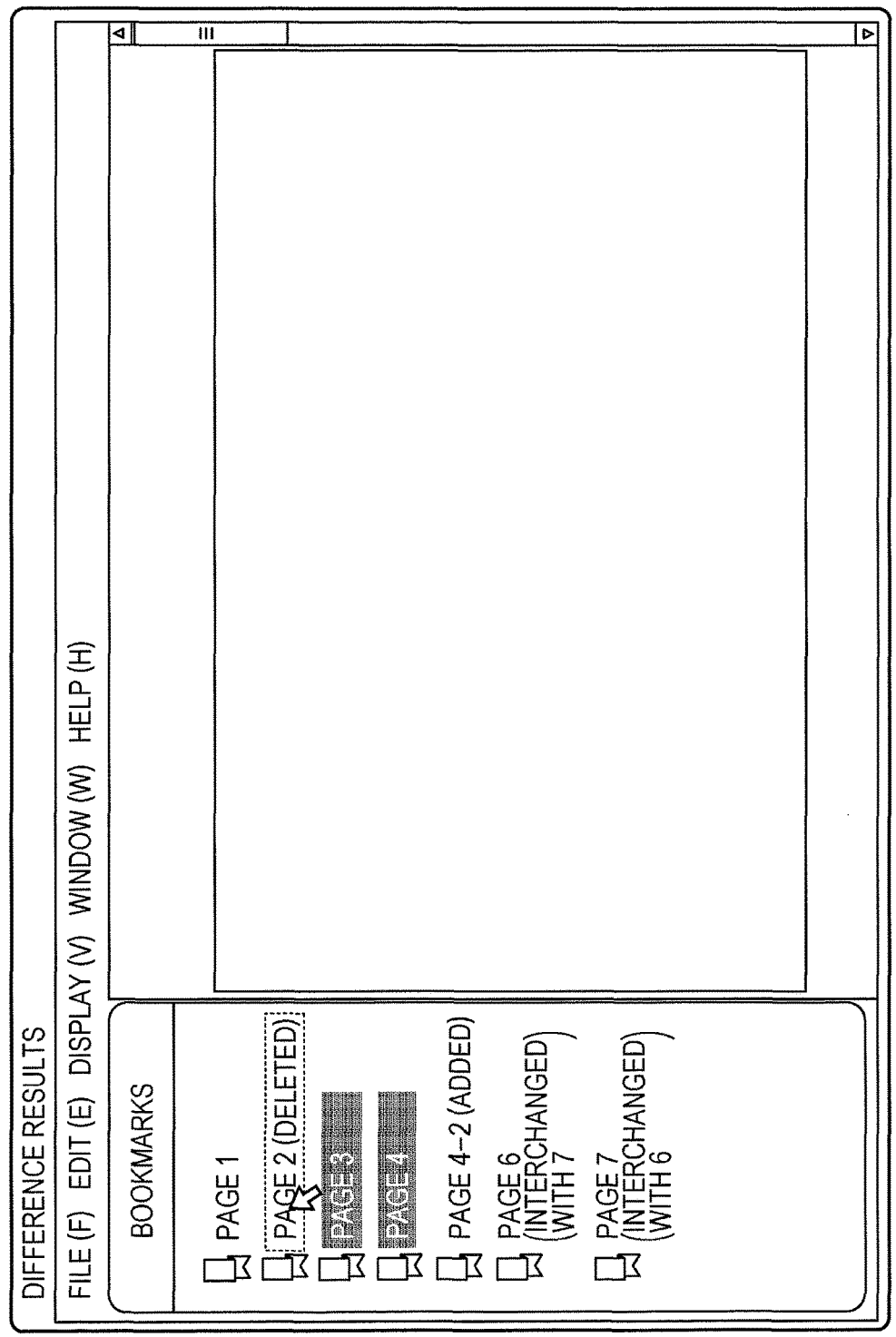
FIG. 21 illustrates a state where a difference display document having electronic bookmarks added thereto is displayed in the fifth exemplary embodiment.

FIG. 21 illustrates a state where a difference display document having electronic bookmarks added thereto is displayed in the fifth exemplary embodiment. As shown in FIG. 21, the bookmark name for the second page is "page 2 (deleted)", and the bookmark name for the fifth page is "page 4-2 (added)". Thus, it is identifiable that the second page has been deleted and that the fifth page has been added. In the fifth exemplary embodiment, although the bookmark name of the first electronic bookmark corresponding to the page added between the fourth page and the fifth page is "page 4-2 (added)", this bookmark name may be changed to "page 5 (added)", and the subsequent page numbers may be changed accordingly.

Furthermore, the bookmark name for the sixth page is "page 6 (interchanged with 7)", and the bookmark name for the seventh page is "page 7 (interchanged with 6)". Thus, it is identifiable that the sixth page and the seventh page have been interchanged.

According to the fifth exemplary embodiment, it may be readily ascertained whether or not there is an edited page by simply checking the contents displayed in the bookmark display portion 84. Furthermore, the contents of page-editing and the position of an edited page may be readily identified.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor configured to:
acquire difference information indicating a correspondence relationship between a difference section and a page having the difference section in two electronic documents each having a plurality of pages;
acquire a difference display document in which the difference section is indicated in contents of at least one of the two electronic documents;
add first electronic-bookmark information to a page having the difference section in the difference display document and that adds second electronic-bookmark information to a page not having the difference section in the difference display document based on the difference information; and
cause a display to display a first electronic bookmark corresponding to the first electronic-bookmark information and a second electronic bookmark corresponding to the second electronic-bookmark information in a distinguishable manner.

2. An image processing apparatus comprising:
a processor configured to:
acquire difference information indicating a correspondence relationship between a difference section and a page having the difference section in two electronic documents each having a plurality of pages;
acquire a difference display document in which the difference section is indicated in contents of at least one of the two electronic documents;
add first electronic-bookmark information only to a page having the difference section in a plurality of pages included in the difference display document based on the difference information; and
cause a display to display the difference display document and a first electronic bookmark corresponding to the first electronic-bookmark information.

3. The image processing apparatus according to claim 1, wherein the first electronic bookmark indicates the number of difference sections in each page.

4. The image processing apparatus according to claim 1, wherein the processor is configured to add difference bookmark information set in correspondence with the difference section to the page having the difference section,
wherein the first electronic-bookmark information and the difference bookmark information have a hierarchical structure in which the first electronic-bookmark information is set to be superior and the difference bookmark information is set to be subordinate, and
wherein the controller is further configured to cause the display to display the first electronic bookmark corresponding to the first electronic-bookmark information and a difference bookmark corresponding to the difference bookmark information in a mode that shows the hierarchical structure.

5. The image processing apparatus according to claim 4, wherein the difference information includes information indicating a correspondence relationship between the difference section and a position of the difference section within the page having the difference section,
wherein the processor is further configured to add the difference bookmark information set in association with positional information indicating the position of the difference section within the page to the page having the difference section based on the difference information, and
wherein, when the difference bookmark is selected, the processor is further configured to highlight and display the difference section set in association with the selected difference bookmark based on the positional information.

6. The image processing apparatus according to claim 5, wherein the difference information includes information indicating a correspondence relationship between the difference section and a range of a region-of-interest that includes the difference section,
wherein the processor is further configured to add the difference bookmark information set in association with region-range information indicating the range of the region-of-interest that includes the difference section to the page having the difference section based on the difference information, and
wherein, when the difference bookmark is selected, the processor is further configured to expand and display the difference section with an expansion rate according to the range of the region-of-interest that includes the difference section corresponding to the selected difference bookmark based on the region-range information.

7. The image processing apparatus according to claim 6, wherein, when the difference bookmark is selected, the processor is configured to expand and display the difference section with an expansion rate set based on a range of a display frame in which the difference display document is displayed and the range of the region-of-interest that includes the difference section corresponding to the selected difference bookmark.

8. The image processing apparatus according to claim 4, wherein the difference information includes information indicating a correspondence relationship between the difference section and a type of the difference section, and
wherein the processor is configured to add the difference bookmark information indicating the type of the difference section to the page having the difference section based on the difference information.

9. The image processing apparatus according to claim 1, wherein the difference information includes information indicating a page that has been edited in one of the two electronic documents, and
wherein the processor is configured to add the first electronic-bookmark information indicating that the page has been edited to the edited page based on the difference information.

10. A non-transitory computer readable medium storing a program causing a computer to execute a process for processing an image, the process comprising:
acquiring difference information indicating a correspondence relationship between a difference section and a page having the difference section in two electronic documents each having a plurality of pages;
acquiring a difference display document in which the difference section is indicated in contents of at least one of the two electronic documents;
adding first electronic-bookmark information to a page having the difference section in the difference display document and adding second electronic-bookmark information to a page not having the difference section in the difference display document based on the difference information; and
displaying a first electronic bookmark corresponding to the first electronic-bookmark information and a second electronic bookmark corresponding to the second electronic-bookmark information in a distinguishable manner.

11. An image processing method comprising:
acquiring difference information indicating a correspondence relationship between a difference section and a page having the difference section in two electronic documents each having a plurality of pages;
acquiring a difference display document in which the difference section is indicated in contents of at least one of the two electronic documents;
adding first electronic-bookmark information to a page having the difference section in the difference display document and adding second electronic-bookmark information to a page not having the difference section in the difference display document based on the difference information; and
displaying a first electronic bookmark corresponding to the first electronic-bookmark information and a second electronic bookmark corresponding to the second electronic-bookmark information in a distinguishable manner.

\* \* \* \* \*